(12) United States Patent
Suzuki

(10) Patent No.: US 7,046,273 B2
(45) Date of Patent: May 16, 2006

(54) SYSTEM AND METHOD FOR COLLECTING IMAGE INFORMATION

(75) Inventor: Ryo Suzuki, Kanagawa (JP)

(73) Assignee: Fuji Photo Film Co., Ltd, Kanagawa (JP)

( * ) Notice: Subject to any disclaimer, the term of this patent is extended or adjusted under 35 U.S.C. 154(b) by 472 days.

(21) Appl. No.: 10/186,976

(22) Filed: Jul. 2, 2002

(65) Prior Publication Data

US 2003/0003925 A1    Jan. 2, 2003

(30) Foreign Application Priority Data

Jul. 2, 2001    (JP)    ............. 2001-201275

(51) Int. Cl.
 *H04N 7/18* (2006.01)
(52) U.S. Cl. ............................ 348/157; 348/153
(58) Field of Classification Search ................ 348/153, 348/157, 159, 169, 579; 345/158; 382/103, 382/106
See application file for complete search history.

(56) References Cited

U.S. PATENT DOCUMENTS

| | | | |
|---|---|---|---|
| 5,363,297 A * | 11/1994 | Larson et al. ................. | 700/91 |
| 5,413,345 A * | 5/1995 | Nauck ......................... | 473/156 |
| 5,513,854 A * | 5/1996 | Daver .......................... | 700/91 |
| 5,714,997 A * | 2/1998 | Anderson ..................... | 348/39 |
| 5,850,352 A * | 12/1998 | Moezzi et al. .............. | 345/419 |
| 5,923,365 A * | 7/1999 | Tamir et al. ................. | 348/169 |
| 6,005,610 A * | 12/1999 | Pingali ........................ | 348/169 |
| 6,072,504 A * | 6/2000 | Segen ......................... | 345/474 |
| 6,252,632 B1 * | 6/2001 | Cavallaro .................... | 348/585 |
| 6,304,665 B1 * | 10/2001 | Cavallaro et al. ........... | 382/106 |
| 6,466,260 B1 * | 10/2002 | Hatae et al. ................. | 348/149 |
| 6,657,584 B1 * | 12/2003 | Cavallaro et al. ...... | 342/357.06 |
| 6,707,487 B1 * | 3/2004 | Aman et al. ................. | 348/169 |
| 2002/0090217 A1 * | 7/2002 | Limor et al. ................. | 396/429 |
| 2003/0048218 A1 * | 3/2003 | Milnes et al. .......... | 342/357.07 |

* cited by examiner

*Primary Examiner*—Vu Le
(74) *Attorney, Agent, or Firm*—Sughrue Mion, PLLC

(57) ABSTRACT

A system and a method for collecting image information wherein high-quality image information representing desired scenes is obtained with certainty. A subject is shot by cameras from mutually different directions and image information thus acquired is stored on a hard disk. When the subject is shot, location information of the subject is obtained from a radio signal transmitted by a marker which has been provided at the subject in advance. On the basis of the location information, a control device controls shooting angle setting devices for changing respective shooting directions of the cameras so that each of the cameras is oriented in a direction from which the subject can be shot.

22 Claims, 20 Drawing Sheets

F I G. 17
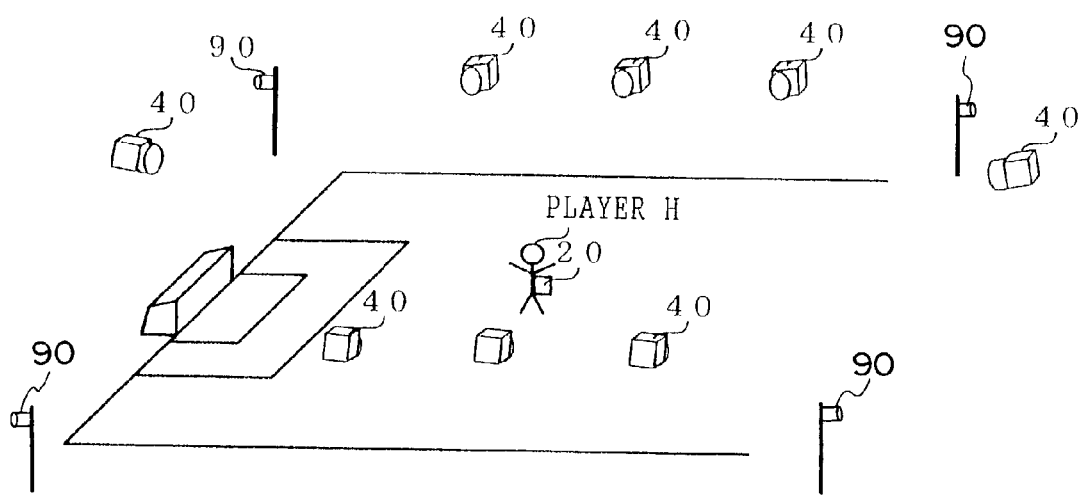

SYSTEM AND METHOD FOR COLLECTING IMAGE INFORMATION

BACKGROUND OF THE INVENTION

1. Field of the Invention

The present invention relates to a system and a method for collecting image information, and more particularly, to a system and a method for collecting image information representing motion images, still images, and the like.

2. Description of the Related Art

Conventionally, images of desired scenes shot at an event, such as an athletic event, have been acquired by, for example, capturing images of those scenes from televised images or by selecting images of the desired scenes from still images taken by photographers.

However, acquisition of high-quality images from televised images has not been possible because the resolution of the televised images is low. In addition, images that are televised are usually shot for a general audience without concern for each and every element or person in the event being shot. For instance, in the case of an athletic event, images that are televised are usually shot without concern for each participating athlete, and it has been difficult for people attempting to obtain images of a particular athlete to obtain the images sought.

Further, when images of desired scenes are selected from still images, there is a drawback in that the images have been shot from a confined position within a limited range. Moreover, when still images of a moving subject are shot, it is difficult to continually track the motion of and shoot the subject at precisely the desired point in time.

SUMMARY OF THE INVENTION

The present invention has been devised in order to solve the above-described problems. An object of the invention is to provide a system and a method for reliably collecting high-quality image information representing desired scenes.

A first aspect of the invention for accomplishing the above-described object is a system for collecting image information comprising: a transmission device provided at a subject for transmitting a radio signal representing a location of the subject; shooting devices for shooting the subject from mutually different directions to generate image information of the subject; a storage device for storing the generated image information; changing devices for changing shooting directions of the shooting devices; and a control device for receiving the radio signal transmitted from the transmission device and controlling the changing devices on the basis of location information of the subject represented by the signal so that at least one of the shooting devices is directed to shoot the subject.

According to the system for collecting image information of the first aspect of the invention, the transmission device provided at the subject transmits the radio signal representing the location of the subject. The radio signal may or may not include information indicating the subject's location (such as latitude, longitude, altitude, and the like). Information indicating the subject's location can be detected using the Global Positioning System (GPS) or the Personal Handy-phone System (PHS). When a radio signal which does not include information indicating the subject's location is transmitted, the radio signal is received by antennas (or receivers) placed at mutually different positions, and the location of the subject can be identified by identifying the source of the radio signal using triangulation. Further, the radio signal may be a radio wave, or light such as infrared light.

Moreover, in the first aspect of the invention, the subject is shot from different directions by the shooting devices, and the acquired image information is stored in the storage device. The shooting devices may be digital cameras, such as digital video cameras and digital electronic still cameras. The storage device may be: a memory, such as a random access memory (RAM), an electrically erasable programmable read-only memory (EEPROM), or Flash memory; a portable storage medium, such as a medium included among Smart Media, a compact flash, an AT attachment card (ATA card), a floppy disk, a CD-Recordable disc (CD-R), a CD-Rewritable disc (CD-RW), a magnetic optical disc, or a magnetic tape; or a fixed storage medium, such as a hard disk or an external storage device provided at a server computer connected to a network.

The control device controls the changing devices for changing shooting directions of the shooting devices on the basis of the location information represented by the radio signal so that at least one of the shooting devices is directed to shoot the subject.

In other words, by shooting the subject with the shooting devices, whose shooting directions are respectively controlled on the basis of the location information of the subject, the subject can be reliably shot in focus by at least one of the shooting devices even when the subject is in motion.

As described above, according to the system for collecting image information of the first aspect of the invention, image information representing desired scenes can be obtained with certainty.

Further, in the system for collecting image information of the first aspect, the control device may calculate distances from the shooting devices to the subject on the basis of the location information of the subject represented by the radio signal, and may control each of the shooting devices so that optical magnification for shooting increases as distance increases, whereby the subject is magnified at the time the subject is shot. Therefore, further magnification of the subject by electronic zooming when the acquired image information is reproduced can be reduced, thereby reducing degradation of image quality resulting from the electronic zooming. Therefore, high-quality image information capable of reproducing high-quality images can be obtained.

The system for collecting image information may further comprise collecting means for collecting sound information of sound generated at at least one of the subject and surroundings thereof while the subject is shot by the shooting devices; and extracting means, connected to the collecting means and the storage device, for extracting, from the image information stored in the storage device, image information acquired during particular time spans including times, at which an intensity of sound represented by the sound information has exceeded a predetermined level.

Generally, spectators at an event respond with cheers and applause or loud jeers when something exciting or noteworthy occurs to draw their attention, and the intensity of sound increases at that point in time. Utilizing this fact, time spans including the times at which the intensity of sound has exceeded the predetermined level are regarded as time spans during which noteworthy scenes have been shot, and the image information acquired via the shooting devices during these time spans can be automatically extracted, as image information to be reproduced, from the image information stored in the storage device. In this manner, noteworthy scenes can be easily extracted from the stored image information.

The subject herein may be at least one of an athlete and a ball used in an athletic event. The athletic event may be any sport involving a ball, wherein players (athletes) move, such as soccer, basketball, handball, water polo, and the like, or any sport not including a ball, such as track events including the sprint, middle distance running, long distance running, the long jump, the high jump, and the like, or other sports such as swimming, cycling, and the like.

A second aspect of the invention for accomplishing the above-described object is a method for collecting image information of a subject using shooting devices for shooting the subject from mutually different directions and a storage device for storing the image information of the subject, comprising the steps of: providing the subject with a transmission device for transmitting a radio signal representing a location of the subject; receiving the radio signal and controlling a shooting direction of at least one of the shooting devices on the basis of location information of the subject represented by the radio signal so that at least one of the shooting devices shoots the subject; and storing the image information acquired via the shooting devices in the storage device. Thus, image information representing desired scenes can be obtained with certainty.

Further, distances from the shooting devices to the subject may be calculated on the basis of the location information of the subject represented by the radio signal, and each of the shooting devices may be controlled so that optical magnification for shooting increases as distance increases. In this manner, high-quality image information capable of reproducing high-quality images can be obtained.

Furthermore, sound information generated at at least one of the subject and surroundings thereof may be collected while the subject is shot by the shooting devices, and image information acquired during particular time spans including times at which the intensity of sound represented by the sound information has exceeded a predetermined level may be extracted from the image information stored in the storage device. In this manner, noteworthy scenes can be easily extracted from the stored image information acquired by shooting.

It should be noted that the subject may be at least one of an athlete and a ball used in an athletic event. The athletic event may be any sport involving a ball, wherein players (athletes) move, such as soccer, basketball, handball, water polo, and the like, or any sport not including a ball, such as track events including the sprint, middle distance running, long distance running, the long jump, the high jump, and the like, or other sports such as swimming, cycling, and the like.

A third aspect of the invention for accomplishing the above-described object is a system for collecting image information comprising: a transmission device provided at a subject for transmitting a radio signal representing a location of the subject; shooting devices for shooting the subject to generate image information including images of the subject, the shooting devices being positioned so that at least one of the shooting devices can shoot the subject; a storage device for storing the image information acquired via the shooting devices; and an extracting device for extracting, from the image information stored in the storage device, image information including images representing at least the subject on the basis of the location information of the subject represented by the radio signal transmitted from the transmission device.

In the third aspect of the invention, the transmission device for transmitting a radio signal representing the location is provided at the subject, image information acquired via the shooting devices for shooting the subject from mutually different positions is stored in the storage device, and image information including image information representing at least the subject is extracted from the image information stored in the storage device on the basis of the location information of the subject represented by the radio signal transmitted from the transmission device. Therefore, image information representing desired scenes can be obtained with certainty.

The third aspect of the invention may further include sound information collecting means for collecting information representing a sound intensity, and the image information extracting device may extract image information including image information representing at least the subject from the image information which has been acquired via the shooting devices during time spans including times at which the intensity of sound represented by the information collected by the sound information collecting means has exceeded the predetermined level.

That is, generally, spectators at an event respond with cheers and applause or loud jeers when something exciting or noteworthy occurs to draw their attention, and the intensity of sound increases at that point in time. Utilizing this fact, the time spans including the times at which the intensity of sound has exceeded the predetermined level are regarded as time spans during which noteworthy scenes have been shot, and image information including image information representing at least the subject is automatically extracted from the image information acquired via the shooting devices during the time spans. In this manner, noteworthy scenes can be easily extracted from the image information acquired by shooting.

Further, the shooting devices may be placed in mutually different positions around an area to be shot in such a manner that substantially all of the area to be shot can be shot by combining shooting areas of the shooting devices.

Thus, the subject can be shot almost certainly by the shooting devices wherever in the area to be shot the subject is located. As a result, image information representing desired scenes can be obtained with certainty.

Moreover, image synthesizing means for synthesizing the image information extracted by the image information extracting device may be included, and the synthesis may be performed in such a manner that image information acquired via the shooting devices whose shooting areas are adjacent to each other become successive in order of time. By reproducing thus synthesized image information, a scene, which appears substantially the same as when the subject located in the area to be shot is continuously observed (shot) while changing the observing (shooting) point, can be reproduced.

It should be noted that, when the image synthesizing means synthesizes image information, it is preferable that image information corresponding to a synthesized image to be positioned between two pieces of image information, which are acquired by shooting and successive (i.e., neighboring) in the shooting time thereof, is newly generated using an interpolation approach such as Morphing, and is inserted between the two pieces of image information (in other words, additional image information to be inserted between two pieces of successive (i.e., neighboring) image information, which have been acquired by shooting, in a synthesized image sequence is preferably generated using an interpolation approach such as Morphing). This makes a synthesized image information appear more natural when it is reproduced. Morphing is a technique for generating motion image information based on two pieces of image information such that (shapes in) an image represented by one of the image information gradually and smoothly changes into (shapes in) an image represented by the other. The word "Morphing" is derived from "move", "morphology".

As described above, when the image information extracted from the image information stored in the storage device is synthesized in such a manner that image information acquired via the shooting devices whose shooting areas are adjacent to each other become successive in order of time, a scene, which appears substantially the same as when the subject located in the area to be shot is continuously observed (shot) while changing the observing (shooting) point, can be reproduced.

A fourth aspect of the invention is a method for collecting image information of a subject using shooting devices and a storage device for storing the image information, comprising the steps of: providing the subject with a transmission device for transmitting a radio signal representing a location of the subject; shooting the subject using the shooting devices in such a manner that at least one of the shooting devices can shoot the subject to generate image information including images of the subject; storing the image information in the storage device; and extracting, from the image information stored in the storage device, image information including images representing at least the subject on the basis of the received location information of the subject.

According to the above-described method for collecting image information, image information representing desired scenes can be obtained with certainty.

The method for collecting image information according to the fourth aspect of the invention may further include the step of collecting information representing an intensity of sound, and the image information including image information representing at least the subject may be extracted from image information acquired via the shooting devices during time spans including times, at which an intensity of sound represented by the collected sound information has exceeded a predetermined level.

Therefore, extraction of noteworthy scenes from the image information acquired by shooting can be easily performed.

Moreover, in the above-described method for collecting image information, the shooting devices are placed in mutually different positions around the area to be shot and substantially all of the area to be shot can be shot by combining shooting areas of the shooting devices.

Therefore, the subject can be shot almost certainly by the shooting devices wherever in the area to be shot the subject is located. As a result, image information representing desired scenes can be obtained with certainty.

Further, the image information extracted from the storage device may be synthesized in such a manner that image information shot by the shooting devices whose shooting areas are adjacent to each other become successive in order of time.

Thus, a scene, which appears substantially the same as when the subject located in the area to be shot is continuously observed (shot) while changing the observing (shooting) point, can be reproduced.

A fifth aspect of the invention for accomplishing the above-described object is a system for collecting image information comprising: obtaining means for obtaining location information representing a location of a subject; shooting devices for shooting the subject to generate image information, the shooting devices being placed in mutually different positions so that at least one of the shooting devices can shoot the subject; a storage device for storing the image information acquired via the shooting devices; extracting means for extracting, from the image information stored in the storage device, image information representing images of the subject; and output changing means for changing, on the basis of the obtained location information, a range of the image information from at least one of the extracting means and the shooting devices, so that the extracted image information includes the image information of the subject. The output changing means may control at least one of the shooting devices and the image information extracting means so that images including the subject are collected.

The location information representing the location of the subject is obtained by the location information obtaining means. It should be noted that the location information includes latitude, longitude and altitude representing the location of the subject. Further, the obtaining means obtains the location information by utilizing GPS, PHS, or the like. The shooting devices and the storage devices used in this aspect may be the same as those used in the previous aspects of the invention.

The output changing means changes the range of image information to be output on the basis of the location information obtained by the location information obtaining means so that the output image information includes image information representing the subject. It should be noted that, for changing the output range of image information by the changing means, a technique wherein the output range of image information acquired via the shooting devices is changed by changing shooting directions of the shooting devices so that the subject located at a position represented by the location information can be shot, a technique wherein the output range of image information is changed by extracting, from the image information stored in the storage device, the image information including image information representing the subject located at a position represented by the location information and outputting it to the storage device or an external device, or the like, can be applied.

In other words, in the invention, the output range of the image information acquired via the shooting devices is changed on the basis of the obtained location information so that the image information representing at least the subject is included. Therefore, the image information representing images including the subject, i.e., image information representing desired scenes can be obtained with certainty.

A sixth aspect of the invention for accomplishing the above-described object is a method for collecting image information of a subject using shooting devices placed in mutually different positions and a storage device for storing the image information, comprising the steps of: obtaining location information representing a location of the subject; shooting the subject using the shooting devices in such a manner that at least one of the shooting devices can shoot the subject to generate image information including images of the subject; storing the image information in the storage device; extracting, from the image information stored in the storage device, image information representing images of the subject; and changing, on the basis of the obtained location information, a range of the image information obtained by at least one of shooting and extracting, so that the extracted image information includes the image information of the subject.

In the sixth aspect of the invention, the output range may be changed by controlling, on the basis of the location information, image information output by at least one of shooting the subject and extracting image information from the storage device so that the extracted image information include images of the subject.

Thus, image information representing desired scenes can be obtained with certainty.

BRIEF DESCRIPTION OF THE DRAWINGS

FIG. 17 is a perspective view showing an example of placement of a marker, cameras and microphones in the image information collection system according to the second embodiment.

DESCRIPTION OF THE PREFERRED EMBODIMENTS

An embodiment of an image information collecting system 10 of the present invention will now be described in detail with reference to the drawings. It should be noted that, description is given of an example in which the invention is applied to collecting image information of a particular player (a subject) in a soccer match.

First Embodiment

Figure 1:
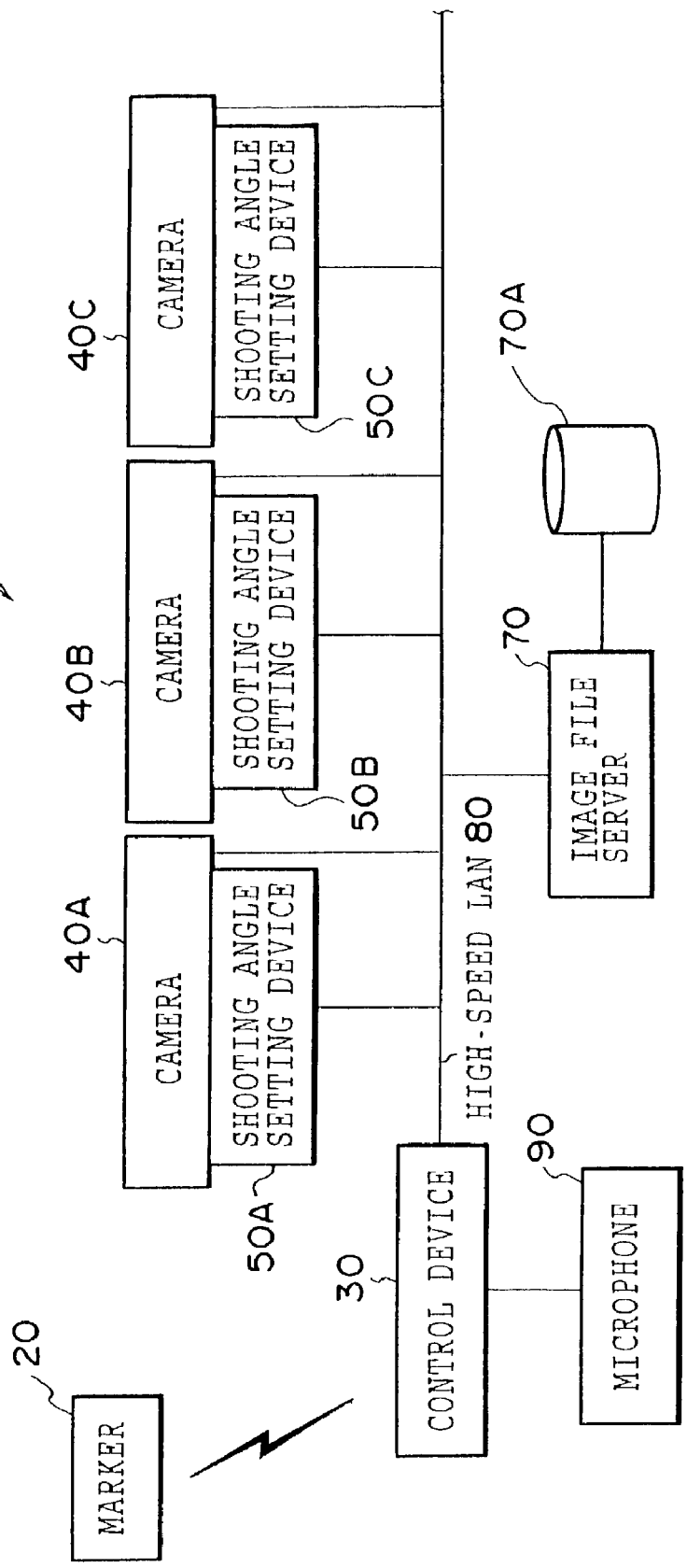
FIG. 1 is a block diagram showing a configuration of an image information collection system according to a first embodiment of the present invention.

First, referring to FIG. 1, a configuration of the image information collecting system 10 according to this embodiment is described. As shown in FIG. 1, the image information collecting system 10 of this embodiment comprises: a marker 20 carried by the subject player; a control device 30 for controlling overall operation of the image information collecting system 10; high-resolution digital video cameras 40A, 40B and 40C (hereinafter simply referred to as "the cameras 40"); shooting angle setting devices 50A, 50B and 50C (hereinafter simply referred to as "the shooting angle setting devices 50") for mechanically changing shooting angles of the cameras 40 respectively mounted thereon; an image file server 70 including a hard disk 70A for storing image information (hereinafter referred to as digital image data) acquired mainly via the cameras 40; and a microphone 90 for collecting sound mainly generated at audience seats.

The control device 30 is interconnected with the cameras 40, the shooting angle setting devices 50 and the image file server 70 via a high-speed LAN 80, so that various information and commands can be communicated between them. The microphone 90 is connected to the control device 30 so that a signal representing sound collected by the microphone 90 is always input to the control device 30.

Figure 2:
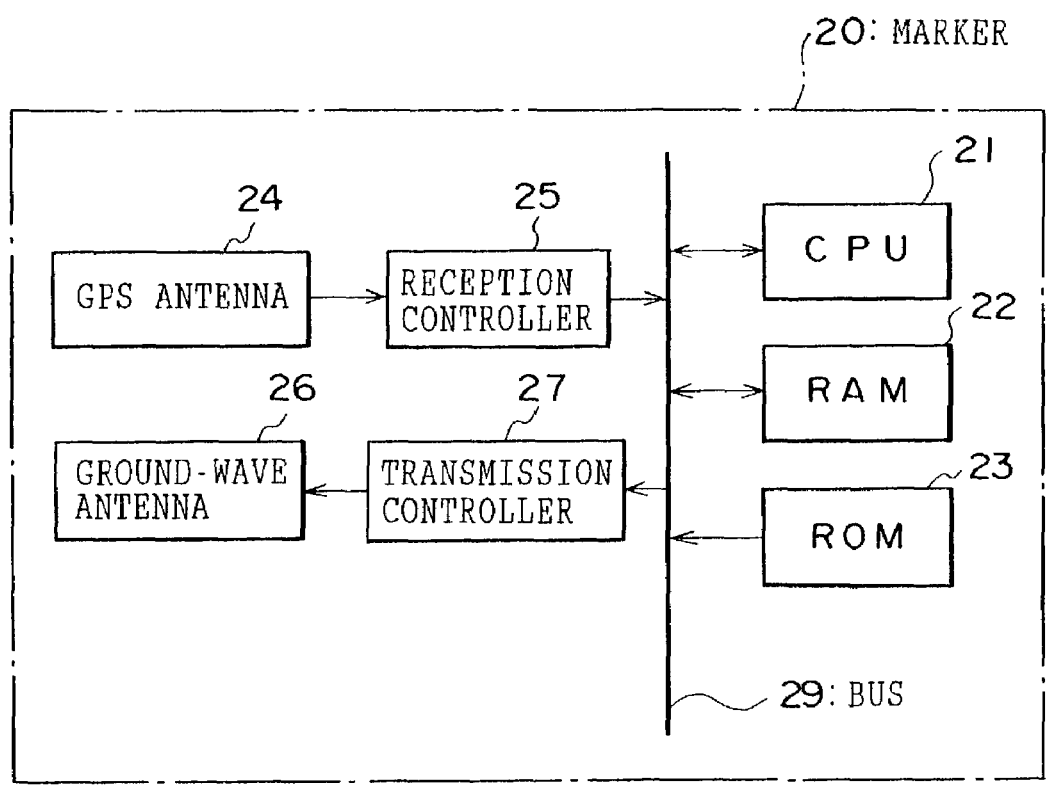
FIG. 2 is a block diagram showing a configuration of a marker according to the embodiment of the invention.

As shown in FIG. 2, the marker 20 according to this embodiment comprises: a central processing unit (CPU) 21 for controlling overall operation of the marker 20; a RAM 22 that is used as a work area, and the like, when the CPU 21 performs various operations; a ROM 23 for storing various parameters, programs, and the like; a reception controller 25 including an antenna 24 for receiving GPS signals from GPS satellites; and a transmission controller 27 including a ground-wave antenna 26 for transmitting a ground wave; all of which are interconnected via a bus 29.

The CPU 21 controls the reception controller 25 so that GPS signals from three or more GPS satellites are received via the antenna 24, derives positional information representing a location of the marker 20 (latitudinal and longitudinal information in this embodiment) on the basis of the received GPS signals using well-known calculations, and controls the transmission controller 27 so that the derived positional information is transmitted as a radio signal via the ground-wave antenna 26.

Figure 3:
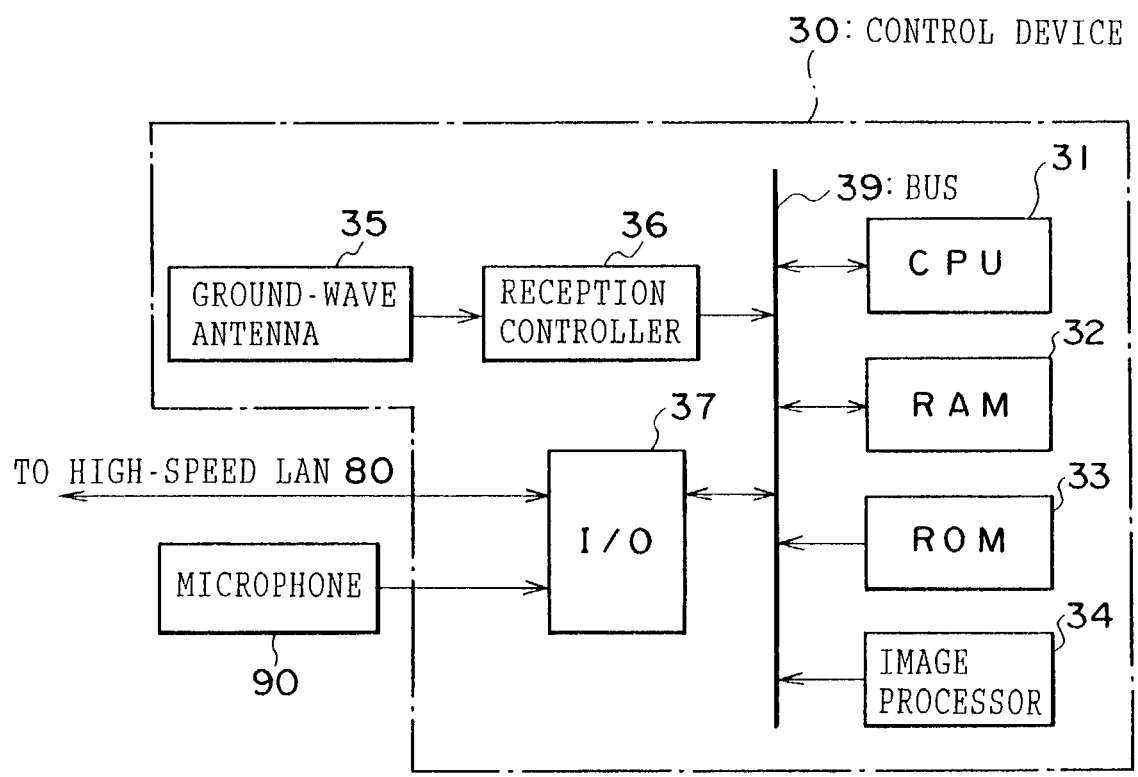
FIG. 3 is a block diagram showing a configuration of a control device according to the embodiment of the invention.

As shown in FIG. 3, the control device 30 according to this embodiment comprises: a CPU 31 for controlling overall operation of the control device 30; a RAM 32 used as a work area, and the like, when the CPU 31 performs various operations; a ROM 33 for storing various parameters, programs, and the like; an image processor 34 for performing various processing, such as compression of digital image data acquired via the cameras 40 according to a predetermined image compression technology (the MPEG (Moving Picture Experts Group) technology is used in this embodiment) and decompression of the compressed digital image data according to an employed image compression technology, and the like; a reception controller 36 including a ground-wave antenna 35 for receiving the radio signal transmitted from the marker 20; and an input/output (I/O) port 37 connectable with the high-speed LAN 80 and the microphone 90; all of which are interconnected via a bus 39.

The CPU 31 controls the reception controller 36 so that the radio signal transmitted from the marker 20 is received via the ground-wave antenna 35. Based on the positional information representing the location of the marker 20 included in the received radio signal, the CPU 31 generates shooting angle data for setting a shooting angle of each of the cameras 40, so that the cameras 40 can shoot the marker 20, and transmits the shooting angle data to each of the shooting angle setting devices 50. Further, the CPU 31 computes distances from the cameras 40 to the marker 20, derives optical magnification (for each of the cameras 40) so that it increases as distance increases, and transmits data representing the optical magnification to each of the cameras 40. It should be noted that, in this embodiment, optical magnification is derived so that the size of the subject carrying the marker 20 (represented by acquired image data) is substantially the same, regardless of the distances from the cameras 40 to the marker 20.

Further, the CPU 31 compresses the digital image data acquired via the cameras 40 using the image processor 34 according to a predetermined image compression format, and then transmits the compressed digital image data to the image file server 70.

Figure 4:
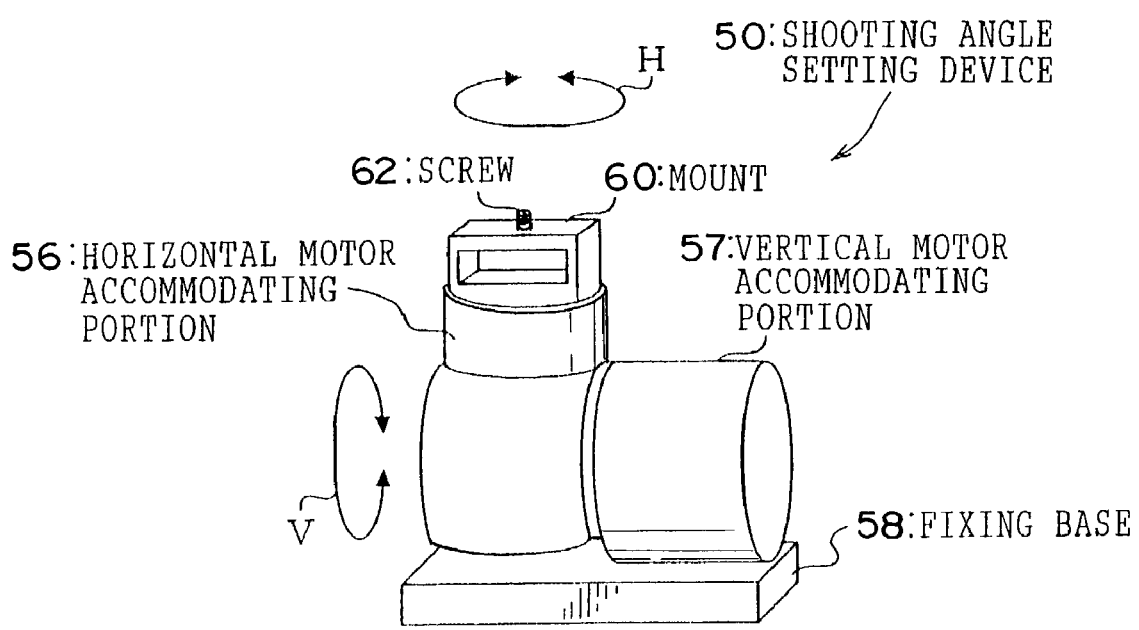
FIG. 4 is a perspective view showing an appearance of a shooting angle setting device according to the first embodiment of the invention.

FIG. 4 shows an appearance of the shooting angle setting device 50 according to this embodiment. As shown in FIG. 4, the shooting angle setting device 50 comprises: a horizontal motor accommodating portion 56 for accommodating a horizontal motor 56A; a vertical motor accommodating portion 57 for accommodating a vertical motor 57A; a fixing base 58, on which the vertical motor accommodating portion 57 is mounted and fixed, with the fixing base 58 including a tapped hole in a lower surface thereof for attaching a tripod, or the like; and a mount 60 including a screw 62 at an upper surface thereof for mounting the camera 40.

The horizontal motor accommodating portion 56 is rotated in the directions of arrow V in FIG. 4 by the vertical motor 57A accommodated in the vertical motor accommodating portion 57. The mount 60 is rotated in the directions of arrow H in FIG. 4 by the horizontal motor 56A accommodated in the horizontal motor accommodating portion 56. In this manner, the shooting direction of the camera 40 fixed on the upper surface of the mount 60 via the screw 62 can be arbitrarily changed. It should be noted that the fixing base 58 is attached to a tripod via the tapped hole provided in the lower surface of the fixing base 58.

Figure 5:
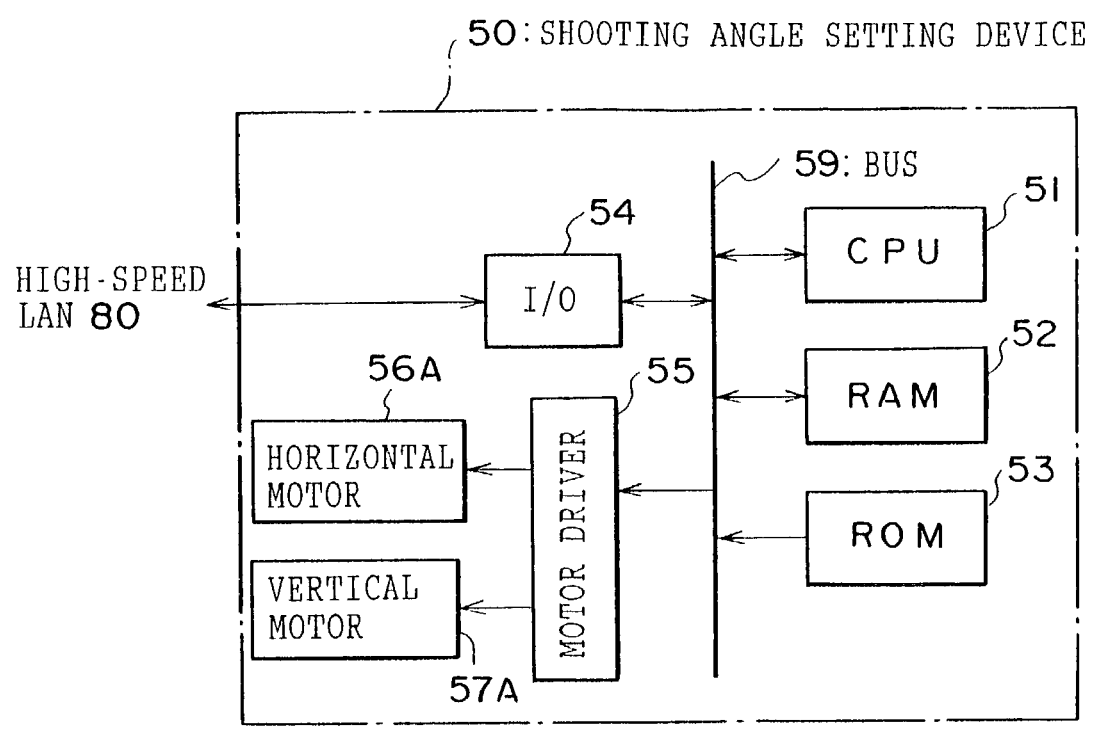
FIG. 5 is a block diagram showing a configuration of the shooting angle setting device according to the first embodiment of the invention.

As shown in FIG. 5, a control system of the shooting angle setting device 50 according to this embodiment comprises: a CPU 51 for controlling overall operation of the shooting angle setting device 50; a RAM 52 used as a work area, and the like, when the CPU 51 performs various operations; a ROM 53 for storing various parameters, programs, and the like; an input/output (I/O) port 54 connectable with the high-speed LAN 80; and a motor driver 55 for rotatably driving the horizontal motor 56A and the vertical motor 57A respectively accommodated in the horizontal motor accommodating portion 56 and the vertical motor accommodating portion 57; all of which are interconnected via a bus 59.

The CPU 51 controls the motor driver 55 so that the horizontal motor 56A and the vertical motor 57A are rotatably driven based on data received from the control device 30 through the high-speed LAN 80 and the I/O port 54. In this manner, the shooting direction of the camera 40 fixed on the shooting angle setting device 50 can be directed toward the subject carrying the marker 20.

Figure 6:
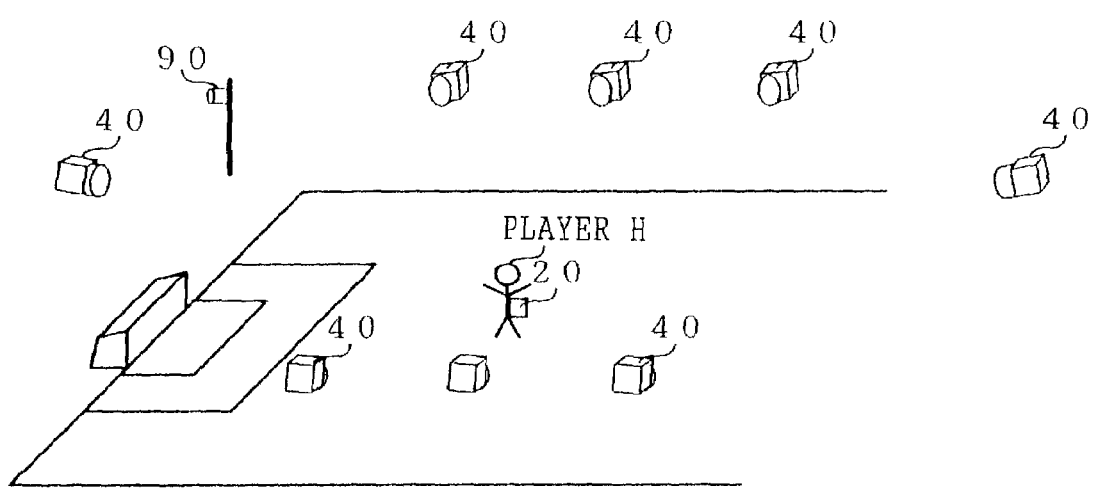
FIG. 6 is a perspective view showing an example of placement of the marker, cameras and a microphone in the image information collection system according to the first embodiment of the invention.

FIG. 6 shows an example of placement of the marker 20, the cameras 40 and the microphone 90. In this example, the marker 20 is carried by a player H, the cameras 40 are placed so as to surround a soccer field to be shot, and the microphone 90 is placed between the soccer field and audience seats (not shown). It should be noted that each of the cameras 40 shown in FIG. 6 is actually fixed, via the screw 62, on the upper surface of the mount 60 of the shooting angle setting device 50 mounted on the tripod.

Figure 7:
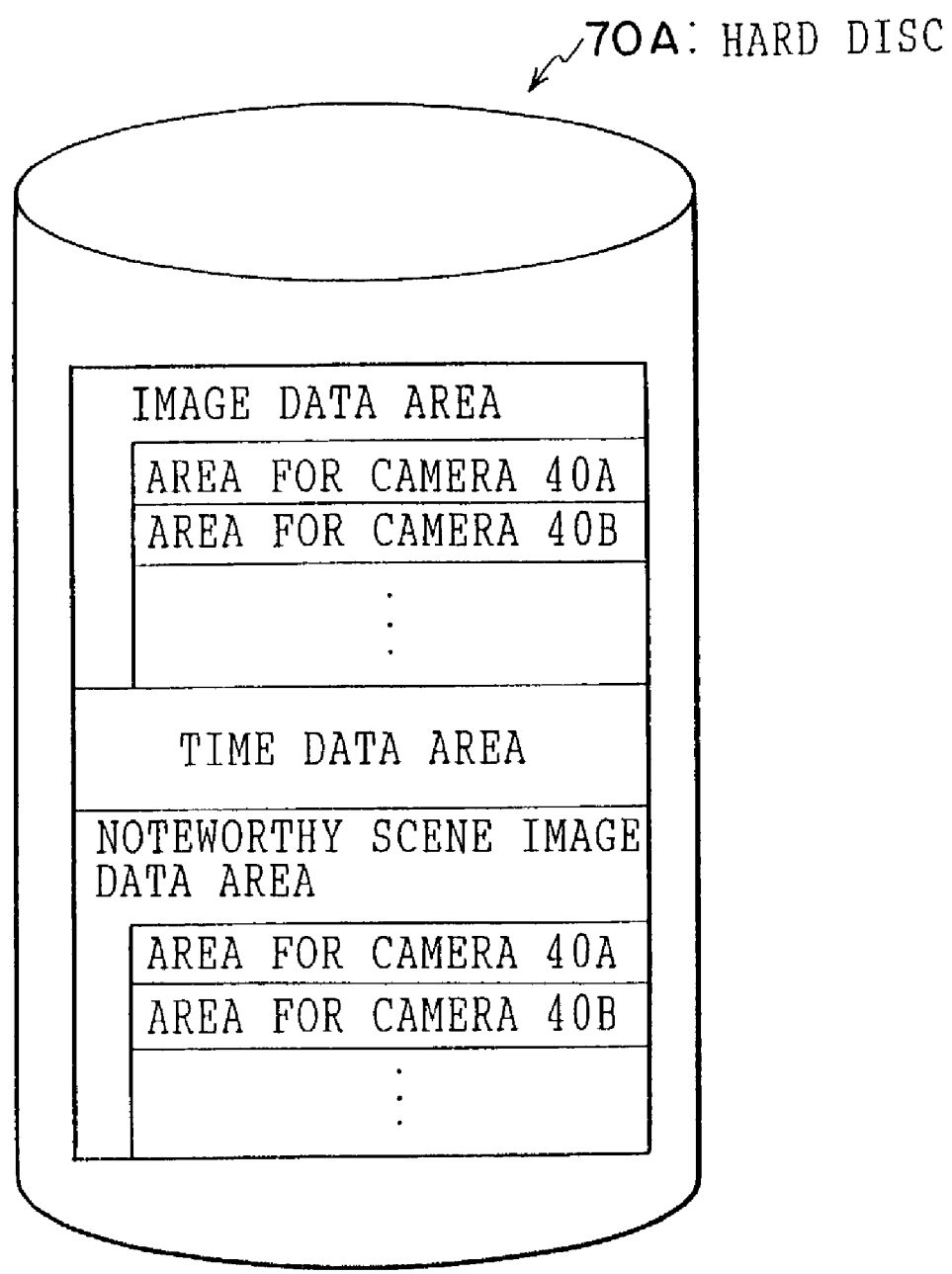
FIG. 7 is a schematic view showing contents of data stored on a hard disk included in an image file server according to the first embodiment of the invention.

FIG. 7 schematically shows contents of data stored in the hard disk 70A according to this embodiment. As shown in FIG. 7, the hard disk 70A includes: an image data area for storing digital image data acquired via the cameras 40 and compressed by the image processor 34 of the control device 30; a time data area for storing time data described later; and a noteworthy scene image data area for storing noteworthy scene image data described later. The image data area and the noteworthy scene image data area are partitioned so as to store image data for each of the cameras 40.

The marker 20 corresponds to a transmission device and obtaining means of the invention, the control device 30 corresponds to a control device and a changing device of the invention, the cameras 40 correspond to shooting devices of the invention, the shooting angle setting devices 50 correspond to shooting direction changing devices of the invention, the hard disk 70A corresponds to a storage device of the invention, and the microphone 90 corresponds to sound information collecting means of the invention.

Figure 8:
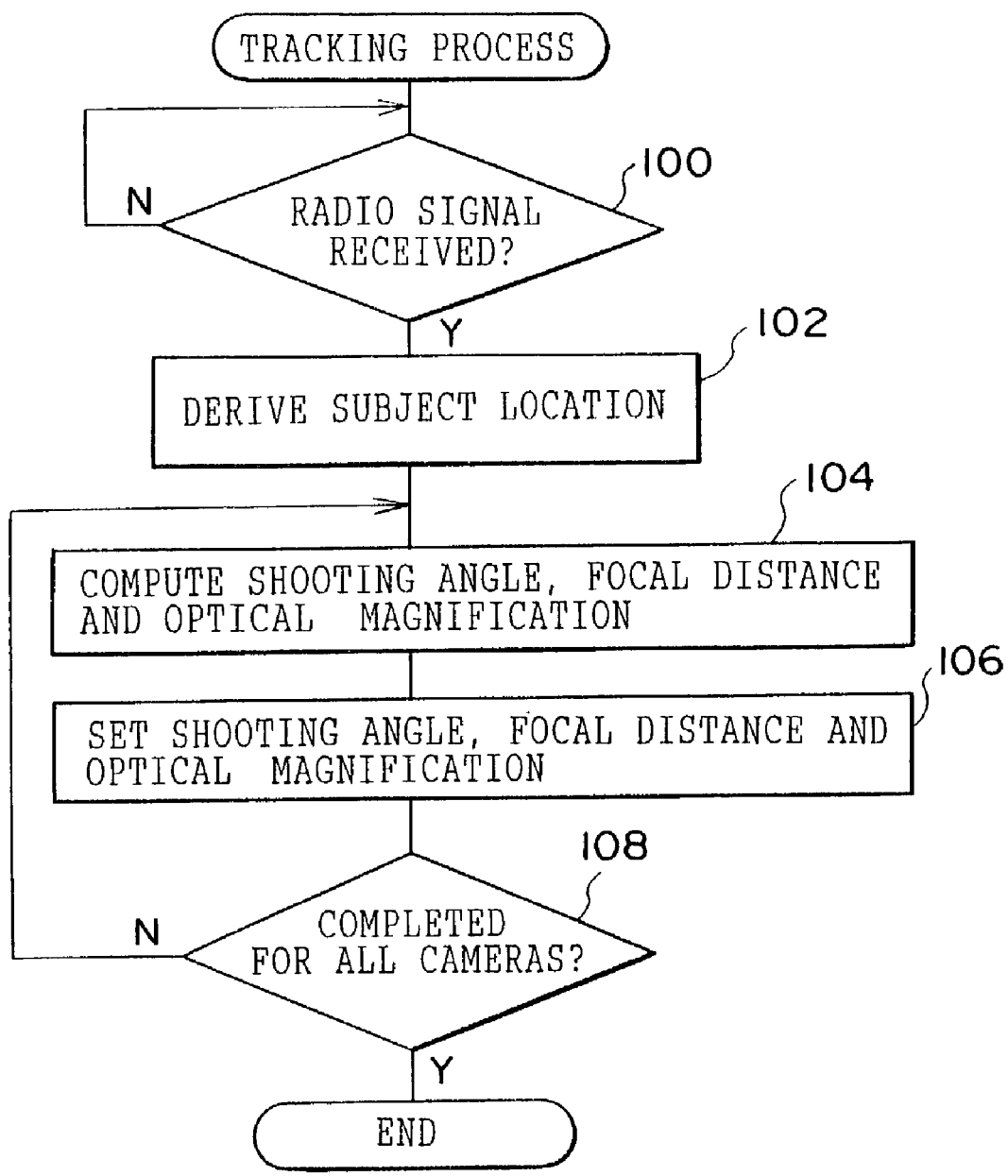
FIG. 8 is a flow chart showing a flow of actions in a tracking program according to the first embodiment of the invention.

Next, operation of the image information collecting system 10 according to this embodiment is described. First, referring to FIG. 8, a tracking process performed by the control device 30 is described. It should be noted that FIG. 8 is a flow chart illustrating a flow of actions in a tracking program, which is repeated at a predetermined time interval, performed by the CPU 31 included in the control device 30 during the tracking process. The tracking program has been prestored in a predetermined area of the ROM 33. Further, in this example, a power switch (not shown) of the marker 20 carried by the player H has been turned on and the radio signal representing the positional information of the marker 20 is transmitted from the marker 20 at a predetermined time interval.

In step 100 shown in FIG. 8, a loop for waiting reception of the radio signal transmitted from the marker 20 is executed. When the signal is received, the process proceeds to step 102. In step 102, latitudinal and longitudinal data representing the location of the player H carrying the marker 20 is derived from the received radio signal.

In step 104, for one of the cameras 40 used in the image information collecting system 10, a shooting angle (angles in horizontal and vertical directions from a predetermined reference shooting direction) for setting the shooting direction of the target camera 40 so that it can shoot the player H, and focal length and optical magnification of the camera 40 (depending on the distance from the camera 40 to the player H) are calculated on the basis of the obtained data representing the location of the player H.

In step 106, the data representing the shooting angle calculated in step 104 is transmitted via the high-speed LAN 80 to the shooting angle setting device 50, on which the target camera 40 is mounted. In response to this, the CPU 51 of the shooting angle setting device 50 generates signals for driving the horizontal motor 56A and the vertical motor 57A so as to set a shooting angle of the mounted camera 40 at the shooting angle (the angles in horizontal and vertical directions) represented by the received data, and then outputs the signals to the motor driver 55 for rotatably driving the horizontal motor 56A and the vertical motor 57A. Thus, the shooting direction of the target camera 40 is set so that the camera 40 is oriented in a direction from which the player H can be shot.

Further, in step 106, the data representing the focal distance and the optical magnification calculated in step 104 are transmitted to the target camera 40 via the high-speed LAN 80. In response to this, relevant portions (not shown) of the camera 40 are controlled so that the focal distance and the optical magnification of the target camera 40 are set at values represented by the received data. Thus, the camera 40 focuses on the player H and the optical magnification is increased as the distance between the camera 40 and the player H is increased, whereby the player H can be shot at an appropriate size.

In step 108, whether or not the actions in steps 104–106 have been performed for all the cameras 40 is determined. If the determination is negative, the process returns to step 104 to repeat the actions in steps 104–106, and the tracking process ends when an affirmative determination is made. It should be noted that, when steps 104–106 are repeated, one of the cameras 40 which has not yet been subjected to the process is set as the target camera 40.

By repeating the above-described tracking process at the predetermined time interval, all of the cameras 40 track the player H for shooting, thereby shooting the player H in focus and at an appropriate size. Therefore, the cameras 40 perform shooting while the tracking process is executed, and sequentially transmit acquired digital image data to the control device 30.

Figure 9:
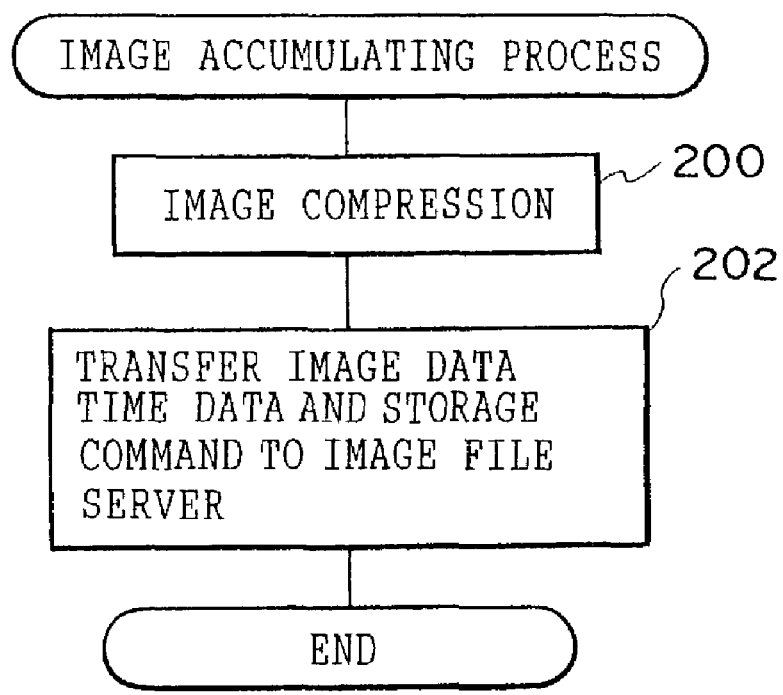
FIG. 9 is a flow chart showing a flow of actions in an image accumulating program according to the embodiment of the invention.

Next, referring to FIG. 9, an image accumulating process performed by the control device 30 is described. It should be noted that FIG. 9 is a flow chart illustrating a flow of actions performed in an image accumulating program executed by the CPU 31 of the control device 30 as an interruption process when digital image data (of an amount) corresponding to a predetermined number of frames is received from any of the cameras 40 while the above-described tracking process is executed. The image accumulating program has also been prestored in a predetermined area of the ROM 33.

In step 200 shown in FIG. 9, the received digital image data (of the amount) corresponding to the predetermined number of frames is compressed by the image processor 34 according to the predetermined image compression format. In step 202, the compressed digital image data, time data representing a shooting time from a point when the shooting (acquisition) of the digital image data has been started, and a command instructing storage of the data into the image data area of the hard disk 70A are transferred to the image file server 70, and the image accumulating process ends.

The image file server 70 stores the compressed digital image data and the time data, which are associated with each other, in a free space in an area preallocated to the camera 40, from which the digital image data is transmitted, within the image data area of the hard disk 70A.

By performing the image accumulating process, the digital image data acquired via the cameras 40 can be stored on the hard disk 70A for each of the cameras 40, with the digital image data being compressed and associated with the time data representing the shooting time.

Figure 10:
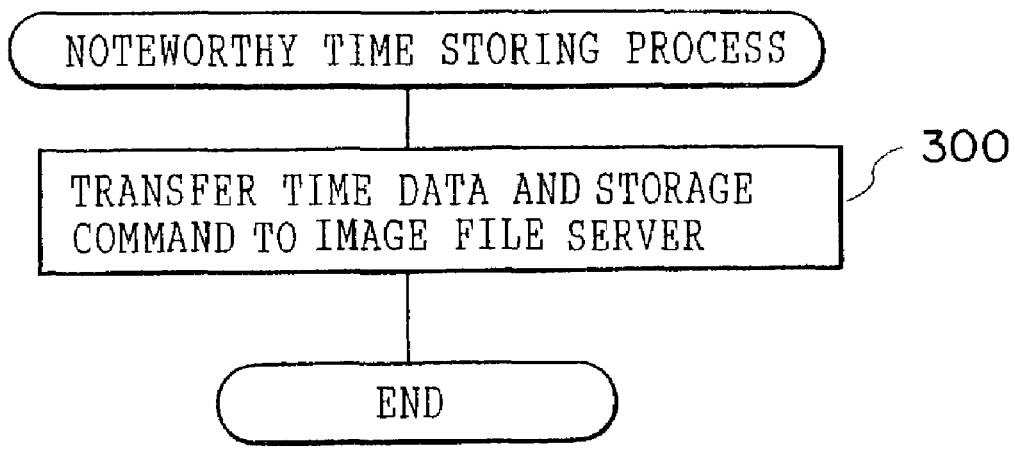
FIG. 10 is a flow chart showing a flow of actions in a noteworthy time storing program according to the embodiment of the invention.

Next, referring to FIG. 10, a noteworthy time storing process performed by the control device 30 is described. It should be noted that FIG. 10 is a flow chart illustrating a flow of actions performed in a noteworthy time storing program executed by the CPU 31 of the control device 30 as an interruption process when an intensity of sound represented by the sound signal input from the microphone 90 exceeds a predetermined level while the above-described tracking process is executed. The noteworthy time storing program has also been prestored in a predetermined area of he ROM 33. In the embodiment, a predetermined value obtained by experimentation or computer simulation is used as the value of the predetermined level, and values (sound intensities) that exceed the predetermined level are regarded as points in time when loud cheers and applause (or jeers) have erupted from the audience.

In step 300 shown in FIG. 10, time data representing a shooting time from a point when the shooting (acquisition) of the digital image data has begun, which data is also transferred to the image file server 70 in step 202 of the image accumulating process (see also FIG. 9), and a command instructing storage of the time data into the time data area of the hard disk 70A are transmitted to the image file server 70. Receiving the time data and the command, the image file server 70 stores the time data in a free space in the time data area of the hard disk 70A, and the noteworthy time storing process ends.

By performing the noteworthy time storing process, time data representing times which can be regarded as points in time when cheers and applause (or jeers) have erupted from the audience can be sequentially stored in the time data area of the hard disk 70A.

Figure 12:
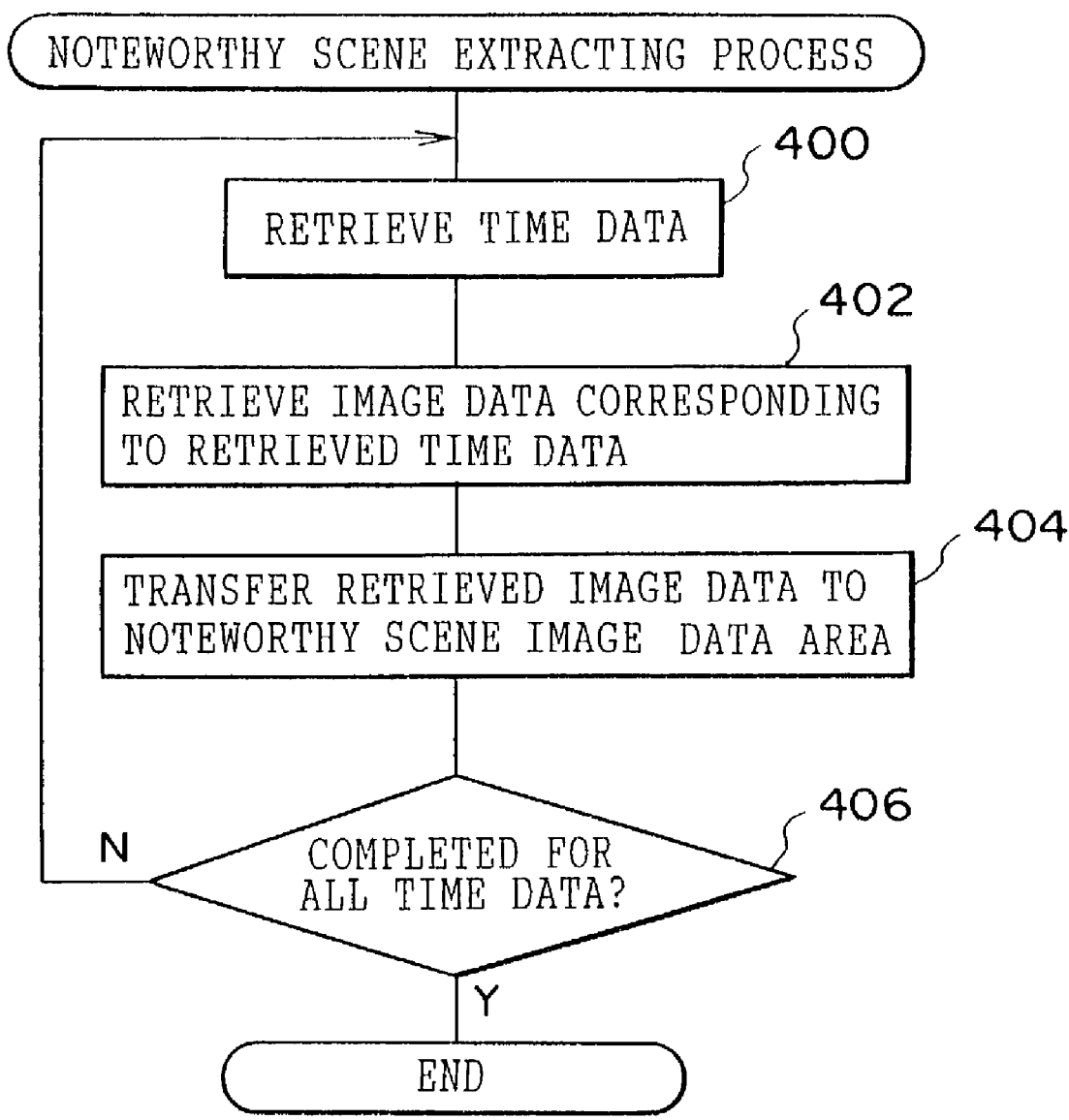
FIG. 12 is a flow chart showing a flow of actions in a noteworthy scene extracting program according to the first embodiment of the invention.

Next, referring to FIG. 12, a noteworthy scene extracting process performed by the control device 30 is described. It should be noted that FIG. 12 is a flow chart illustrating a flow of actions performed in a noteworthy scene extracting program executed by the CPU 31 of the control device 30 after the above-described tracking process (see also FIG. 8) has ended. The noteworthy scene extracting program has also been prestored in a predetermined area of the ROM 33.

In step 400 shown in FIG. 12, one piece of the time data stored in the time data area of the hard disk 70A during the above-described noteworthy time storing process (see also FIG. 10) is retrieved. In step 402, (a portion of) the digital image data acquired via the cameras 40 during a particular time span, which includes the shooting time represented by the retrieved time data, is retrieved from the image data area of the hard disk 70A. In step 404, the retrieved digital image data and a command instructing storage of the digital image data into the noteworthy scene image data area of the hard disk 70A are transmitted to the image file server 70. Thus, the retrieved digital image data is transferred to a free space in an area allocated to the camera 40, which has shot the image, within the noteworthy scene image data area of the hard disk 70A.

In step 406, whether or not the actions in steps 400–404 have been completed for all of the time data stored in the time data area of the hard disk 70A is determined. If the determination is negative, the process returns to step 400 and steps 400–404 are repeated. When an affirmative determination is made, the noteworthy scene extracting process ends.

It should be noted that when steps 400–406 are repeated, time data which has not yet been retrieved is retrieved in step 400.

By performing the noteworthy scene extracting process, only digital image data which has been acquired during time spans including moments at which noteworthy plays have been made, such as a moment at which a goal has been scored, can be extracted from the digital image data stored in the image data area to be stored in the noteworthy scene image data area of the hard disk 70A. Therefore, by reading the extracted digital image data from the noteworthy scene image data area and reproducing the images, images of interest to the audience are obtained.

Figure 13:
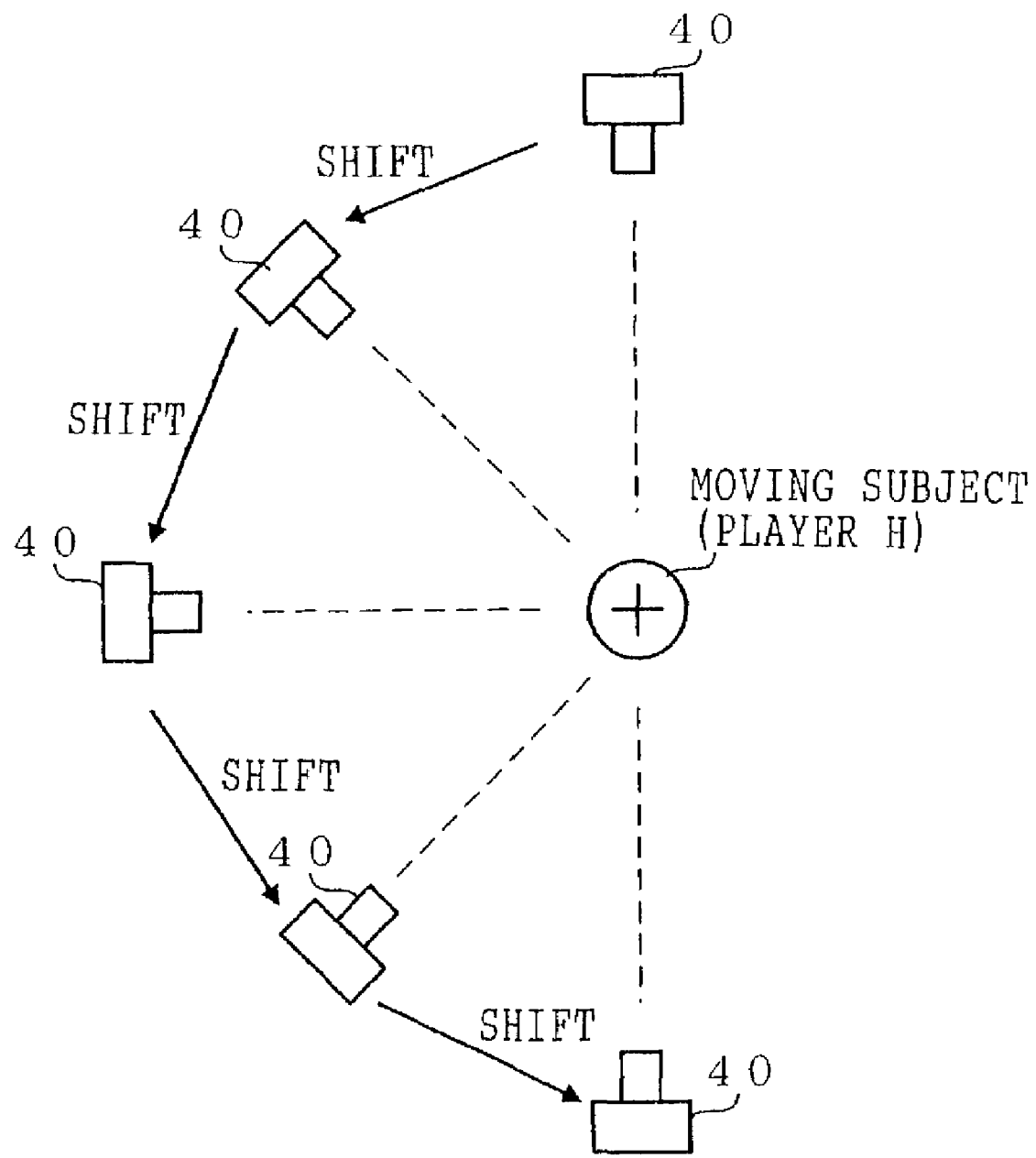
FIG. 13 is a schematic view for explaining an example of processing digital image data.

Further, by using the digital image data stored in the noteworthy scene image data area for each of the cameras 40 and applying known computer graphics techniques, digital image data representing a motion image which appears as if a moving subject is successively (continuously) shot by one camera 40 at mutually different shooting positions surrounding the subject, as shown in FIG. 13, can be generated. The noteworthy scene extracting process corresponds to image information extracting means of the invention.

As described in detail above, in the image information collecting system 10 according to this embodiment, the positional information (information including latitude and longitude) representing the location of the subject (player H) is obtained, the digital image data acquired via the cameras 40 for shooting the subject from mutually different directions or positions is stored in the hard disk 70A, and, on the basis of the positional information, an output range of digital image data from each of the cameras 40 is changed so that image information representing at least the subject is included therein. Therefore, digital image data representing desired scenes can be obtained with certainty.

In other words, in the image information collecting system 10 according to this embodiment, the subject (player H) is provided with the marker 20 for transmitting the radio signal representing the location, and the shooting direction of at least one of the cameras 40, which shoot the subject from mutually different positions, is controlled to shoot the subject on the basis of the location of the subject represented by the transmitted radio signal, and the digital image data acquired via the cameras 40 is stored on the hard disk 70A. Therefore, digital image data representing desired scenes can be obtained with certainty.

Further, in the image information collecting system 10 according to this embodiment, the distance from each of the cameras 40 to the subject is calculated based on the location of the subject represented by the radio signal, and at least one of the cameras 40 is controlled so that optical magnification for shooting increases as distance increases. Therefore, when the digital image data acquired by shooting by the cameras is reproduced, electronic zooming magnification for enlarging the subject can be suppressed, thereby providing high-quality digital image data which can provide high-quality images.

Furthermore, in the image information collecting system 10 according to this embodiment, the sound information is collected during the shooting, and the digital image data acquired via the cameras 40 during particular time spans including the times at which the intensity of sound represented by the collected information has exceeded the predetermined level are extracted, as image information to be reproduced, from the digital image data stored on the hard disk 70A. This facilitates extraction of noteworthy scenes from the acquired digital data.

Second Embodiment

In an image information collecting system according to a second embodiment of the invention, image information acquired via the shooting devices is stored in the storage device, and image information including image information representing the subject is extracted from the image information stored in the storage device on the basis of the location of the subject.

Figure 16:
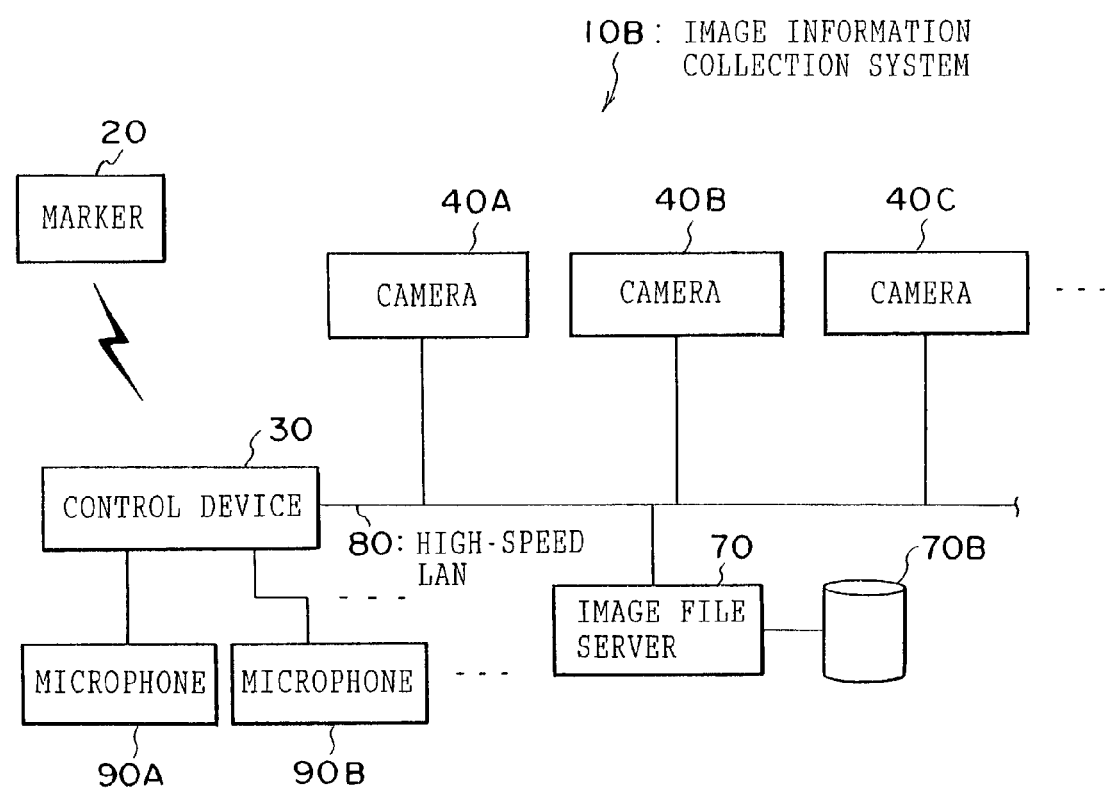
FIG. 16 is a block diagram showing a configuration of an information collecting system according to a second embodiment.

Referring to FIG. 16, first, a configuration of the image information collecting system 10B according to the second embodiment is described. It should be noted that components which are the same as those shown in FIG. 1 are designated by the same reference numerals in FIG. 16, and explanation thereof is omitted.

As shown in FIG. 16, differences between the image information collecting system 10B of the second embodiment and the image information collecting system 10 of the first embodiment lie in that the shooting angle setting devices 50 are not included, that there are a plurality of microphones 90 for collecting sound raised mainly at the audience seats as sound signals, and that the hard disk included in the image file server 70 is a hard disk 70B for storing information, which is different from that stored in the hard disk 70A in the previous embodiment.

The microphones 90 (90A and 90B) are connected to the control device 30, and sound signals collected by the microphones 90 are continuously input to the control device 30.

FIG. 17 shows an example of placement of the marker 20, the cameras 40 and the microphones 90 in the image information collecting system 10B according to the second embodiment. In the example shown in FIG. 17, the marker 20 is carried by the particulars player H, the cameras 40 are placed in mutually different positions so as to surround the soccer field to be shot, and the microphones 90 are placed in mutually different positions between the soccer field and audience seats (not shown).

The cameras 40 of the second embodiment are positioned so that all of the area to be shot (the all area of the field in the example shown in FIG. 17) can be shot by combining shooting areas respectively covered by the cameras 40.

Figure 18:
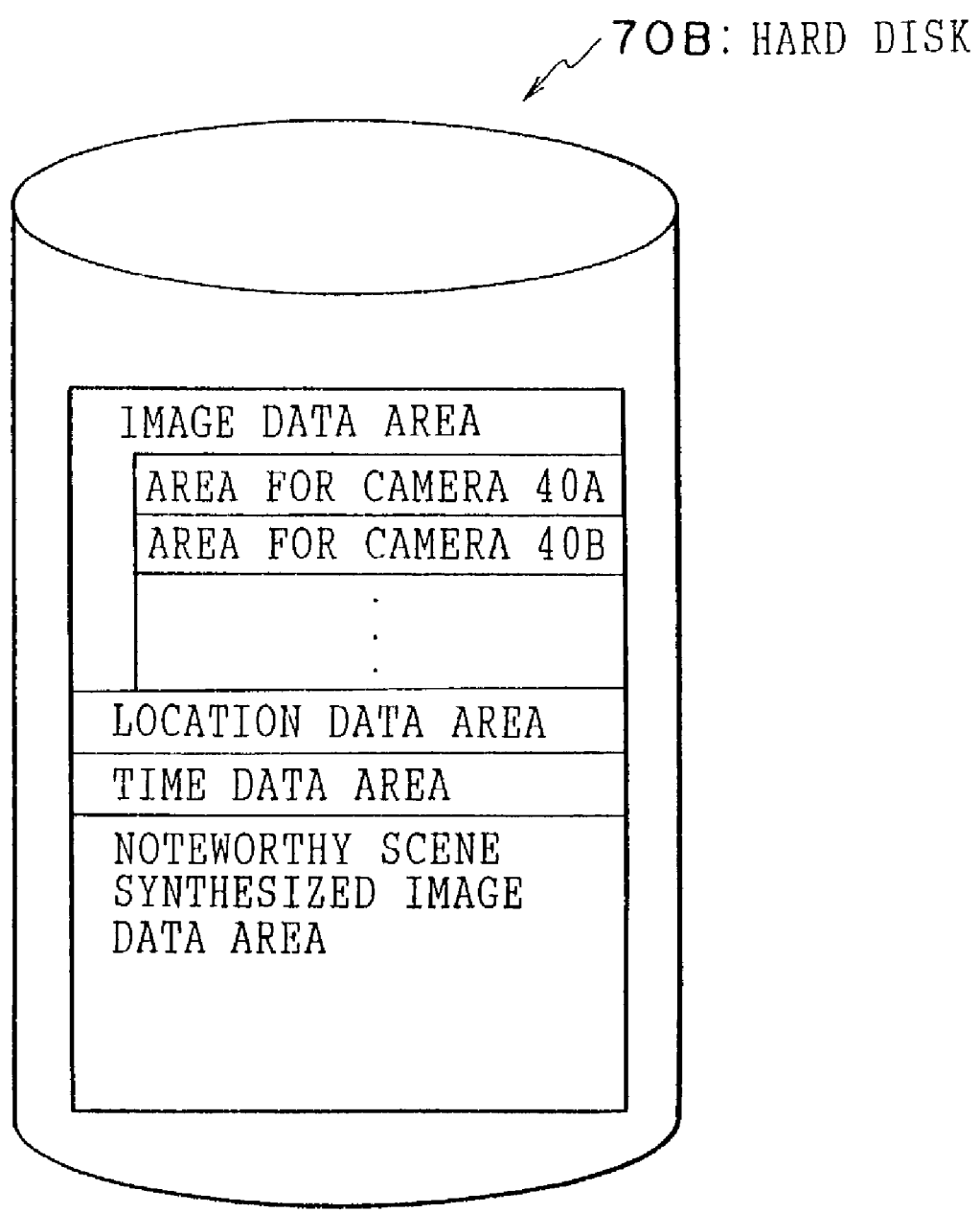
FIG. 18 is a schematic view showing contents of data stored in a hard disk included in an image file server according to the second embodiment.

FIG. 18 schematically shows contents of data stored in the hard disk 70B according to this embodiment. As shown in FIG. 18, the hard disk 70B includes an image data area for storing digital image data acquired via the cameras 40 and compressed by the image processor 34 of the control device 30; a location data area for storing location data described later; a time data area for storing time data similarly to the first embodiment; and a noteworthy scene synthesized image data area for storing noteworthy scene synthesized image data described later. The image data area is partitioned so as to store image data for each of the cameras 40.

Configurations of the marker 20 and the control device 30 in the second embodiment are the same as those in the first embodiment (see FIGS. 2 and 3), and explanations thereof are omitted.

The marker 20 corresponds to a location signal transmission device and obtaining means of the invention, the control device 30 corresponds to a changing device, an image information extracting device and image synthesizing means of the invention, the cameras 40 correspond to shooting devices of the invention, the hard disk 70B corresponds to a storage device of the invention, and the microphones 90 correspond to sound information collecting means of the invention.

Next, operation of the image information collecting system 10B according to the second embodiment is described.

It should be noted that, in this example, a power switch (not shown) of the marker 20 carried by the player 20 has been turned on and the radio signal representing the location information is transmitted by the marker 20 at a predetermined time interval.

In the image information collecting system 10B according to the second embodiment, in order to start shooting by the cameras 40, the control device 30 transmits a start-shooting instruction command for instructing to start shooting to each of the cameras 40, and stores the time at this point (equivalent to the above-described point when the shooting has been started) at a predetermined address in the RAM 32. Each of the cameras 40 which has received the start-shooting instruction command starts shooting, and transmits digital image data representing the motion image acquired by shooting to the control device 30. In order to stop the shooting, the control device 30 transmits a stop-shooting instruction command for instructing to stop shooting to each of the cameras 40. In response to the command, each of the cameras 40 stops shooting.

In the control device 30 according to the second embodiment, when digital image data (of an amount) corresponding to a predetermined number of frames is received from any of the cameras 40, the image accumulating program is executed as an interruption process similarly to the first embodiment as shown in FIG. 9. In this manner, the digital image data acquired via the cameras 40 can be stored in the image data area of the hard disk 70B for each of the cameras 40 in a state in which the digital image data is compressed and is associated with the above-described time data representing the shooting time from the point when the shooting has been started.

Further, in the control device 30 according to the second embodiment, when an intensity of sound represented by the sound signal input from any of the microphones 90 exceeds a predetermined level while shooting by the cameras 40 is performed, the noteworthy time storing process (see FIG. 10) is executed as an interruption process similarly to the first embodiment. A predetermined value obtained by experimentation or computer simulation is used as the value of the predetermined level, and values (sound intensities) that exceed the predetermined level are regarded as points in time when loud cheers and applause (or jeers) have erupted from the audience.

Figure 11:
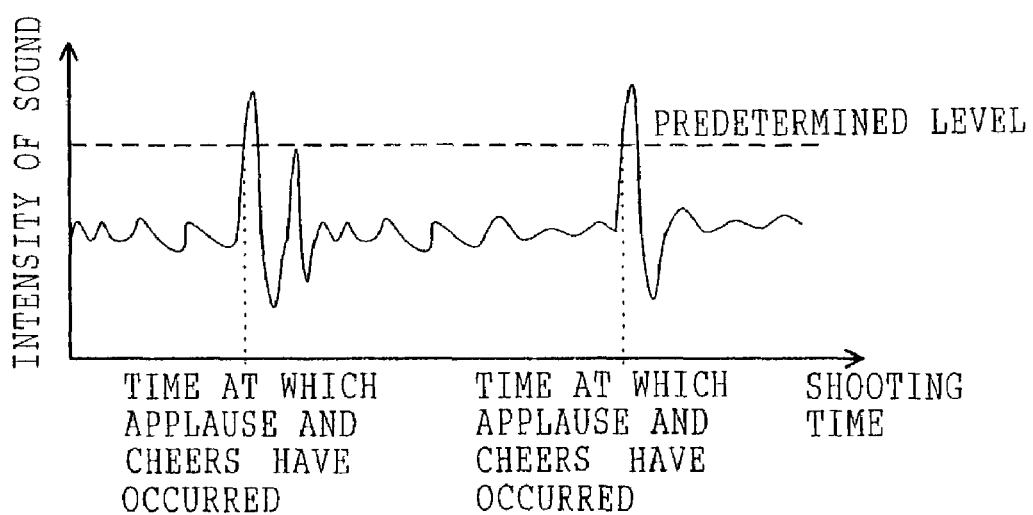
FIG. 11 is a graph for explaining the actions in the noteworthy time storing program according to the embodiment of the invention.

By performing the noteworthy time storing process, the time data representing the shooting time from the point when the shooting has been started, which can be considered to coincide with the time at which the audience raised cheers, as shown in FIG. 11, can be sequentially stored in the time data area of the hard disk 70B.

Figure 19:
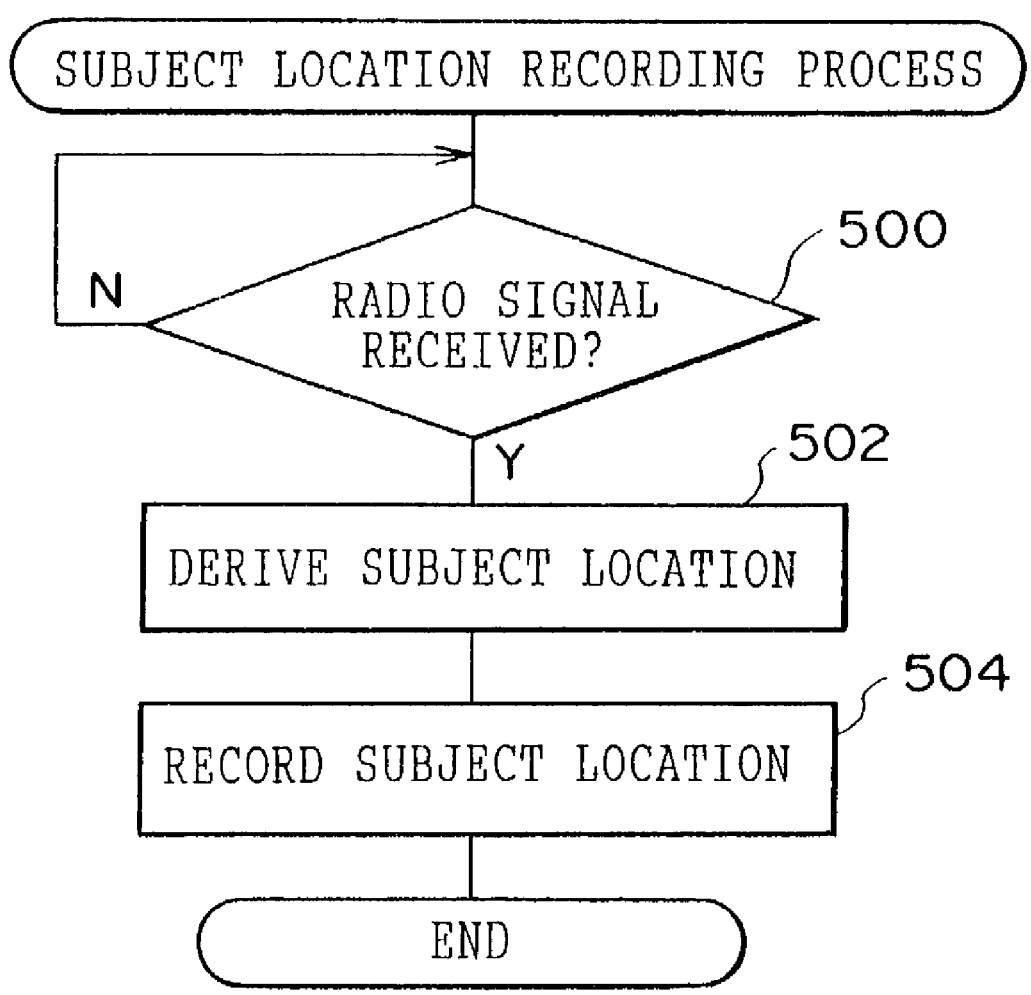
FIG. 19 is a flow chart showing a flow of actions in a subject location recording program according to the second embodiment.

Next, referring to FIG. 19, a subject location recording process performed by the control device 30 according to the second embodiment is described. It should be noted that FIG. 19 is a flow chart illustrating a flow of actions performed in a subject location recording program executed by the CPU 31 included in the control device 30 repeatedly at a predetermined time interval, while shooting by the cameras 40 is carried out. This program has been stored in a predetermined area of the ROM 33 in advance.

In step 500 shown in FIG. 19, a loop for waiting reception of the radio signal transmitted from the marker 20 is executed. When the signal is received, the process proceeds to step 502. In step 502 next, data including latitude and longitude representing the location of the player H carrying the marker 20 is derived from the received radio signal.

In step 504 next, the data including the latitude and the longitude derived in step 502 is stored, through the image file server 70, in the location data area of the hard disk 70B as the location data representing the location of the player H in association with the time data representing the shooting time from the point when the shooting has been started, and then the subject location recording process ends.

By performing the subject location recording process, the location data representing the location of the player H from the start to the end of the shooting can be recorded on the hard disk 70B.

Figure 20:
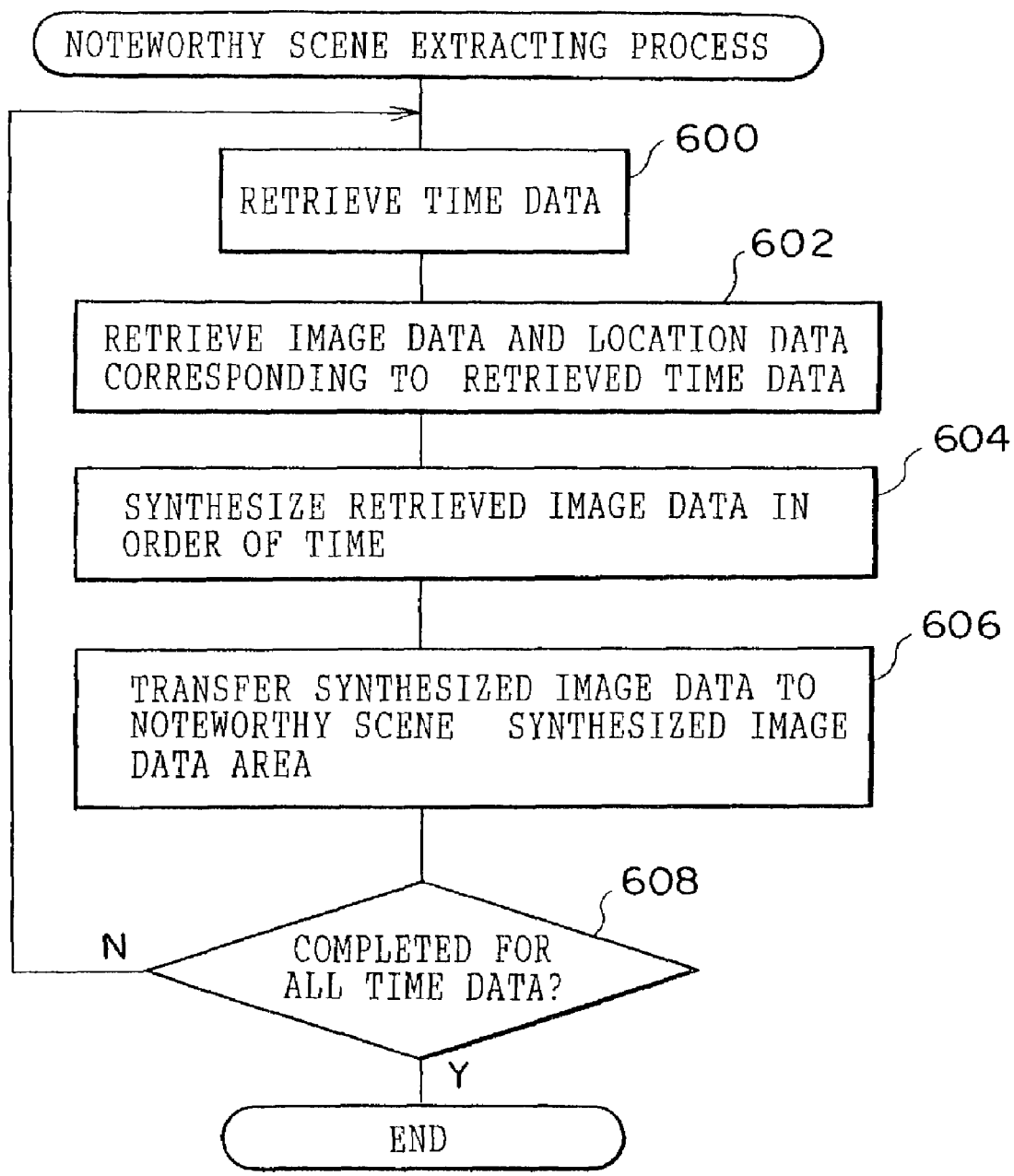
FIG. 20 is a flow chart showing a flow of actions in a noteworthy scene extracting program according to the second embodiment.
Figure 21E:
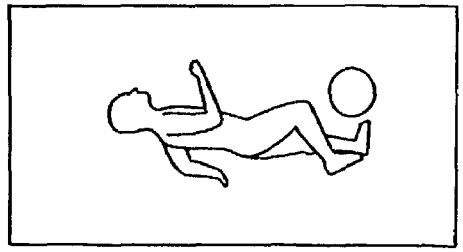
FIGS. 21A to 21E are schematic views for explaining a synthesized image obtained through the noteworthy scene extracting program according to the second embodiment.
Figure 21D:
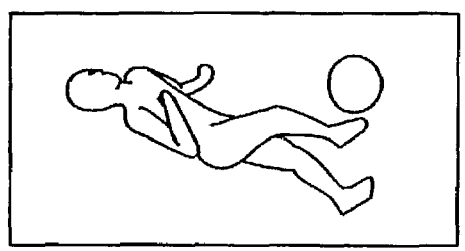
Figure 21C:
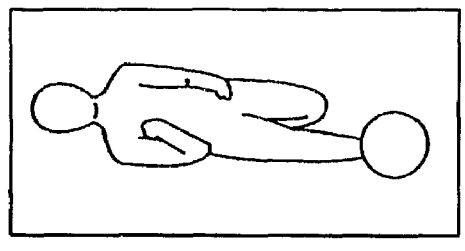
Figure 21B:
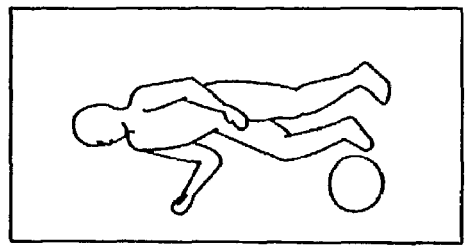
Figure 21A:
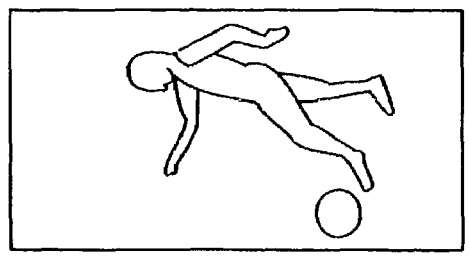

Next, referring to FIG. 20, a noteworthy scene extracting process performed by the control device 30 according to the second embodiment is described. It should be noted that FIG. 20 is a flow chart illustrating a flow of actions performed in a noteworthy scene extracting program executed by the CPU 31 of the control device 30 according to the second embodiment after the shooting by the cameras 40 has ended. This program has also been stored in a predetermined area of the ROM 33 in advance.

In step 600 shown in FIG. 20, one of the time data stored in the time data area of the hard disk 70B through the above-described noteworthy time storing process (see also FIG. 10) is retrieved. In step 602 next, a portion of the digital image data acquired via the cameras 40 during a time span, which includes the shooting time represented by the retrieved time data, and the location data stored during a time span to be processed, through the above-described subject location recording process, are retrieved from the image data area and the location data area of the hard disk 70B. The time span in this embodiment has a length of 20 seconds including 10 seconds before the relevant shooting time and 10 seconds after the relevant shooting time, and is referred hereinafter as "time span to be processed". In step 604 next, the retrieved digital image data is synthesized in order of time as described below.

First, on the basis of the location data retrieved in step 602 and positions of the cameras 40, a distance between the player H and each of the cameras 40 and a location of the player H in a shooting area of each of the cameras 40 during the time span to be processed are calculated.

Then, on the basis of the distance between the player H and each of the cameras 40 and the location of the player H in the shooting area of each of the cameras 40 during the time span to be processed, which have been calculated above, digital image data including image data representing the player H is extracted from the digital image data retrieved in step 602 above. It should be noted that, in this embodiment, the extraction is performed in such a manner that a ratio of the image data representing the player H is the greatest at the central time in the time span to be processed, and gradually decreases forward and backward from the central time regardless of the distances between the player H and the cameras 40.

Next, electronic zooming is performed on each of the extracted digital image data so that numbers of pixels in a horizontal direction and a vertical direction become equal to those of digital image data acquired via the cameras 40. Thus, sizes of the extracted digital image data can be made the same.

Finally, the digital image data for each of the cameras 40 which have been subjected to electronic zooming are synthesized. The synthesis is performed such that digital image data shot by the cameras 40 whose shooting areas are adjacent to each other become successive in order of time. It should be noted that, when the synthesis is performed, additional digital image data corresponding to an image which should be present between two pieces of successive digital image data is generated using an interpolation approach such as morphing and is inserted between the two pieces of digital image data. This makes a reproduced motion image synthesized from the image data appear more natural.

FIGS. 21A to 21E schematically show an example of an image reproduced from the digital image data obtained by the above-described image synthesizing process. In this example, a reproduction time progresses in the order of 21A, 21B, 21C, 21D and 21E. Further, although the images in FIGS. 21A to 21E are shown as still images, actually these images are reproduced as motion images. Furthermore, when the images shown in FIGS. 21A to 21E are joined, additional digital images (not shown) to be inserted between the images shown in FIGS. 21A to 21E, which correspond to time spans between the images shown in FIGS. 21A to 21E, may be synthesized using an interpolation approach such as morphing.

As shown in FIGS. 21A to 21E, digital image data representing a motion image of the player H, which has been continuously shot from mutually different positions around the player H during the time span to be processed, can be obtained through the above-described image synthesizing process.

In step 606 next, the synthesized digital image data obtained through the process in step 604 and an instruction command for instructing storage of the digital image data in the noteworthy scene synthesized image data area of the hard disk 70B are transmitted to the image file server 70, and the synthesized digital image data is stored in a free space in the noteworthy scene synthesized image data area of the hard disk 70B.

In step 608 next, whether or not the actions in steps 600 to 606 have been completed for all of the time data stored in the time data area of the hard disk 70B is determined. If the determination is negative, the process returns to step 600 to repeat steps 600–606, and when an affirmative determination is made, the noteworthy scene extracting process ends.

It should be noted that, when steps 600–608 are repeated, one piece of the time data which has not yet been retrieved is retrieved.

By performing the noteworthy scene extracting process, only digital image data which has been acquired during time spans including moments at which noteworthy plays have been made, such as a moment at which a goal has been scored, can be extracted from the digital image data stored in the image data area and synthesized in order of time, and then can be stored in the noteworthy scene synthesized image data area of the hard disk 70B. Therefore, by reading the extracted digital image data from the noteworthy scene synthesized image data area and reproducing the images, images of interest to the audience are reproduced (obtained) as shown in FIGS. 21A to 21E.

As described in detail above, in the image information collecting system 10B according to this embodiment, the positional information (information including latitude and longitude) representing the location of the subject (player H) is obtained, the digital image data acquired via the cameras 40 for shooting the subject from mutually different positions is stored in the image data area of the hard disk 70B, and, on the basis of the positional information, image data including that representing at least the subject is extracted from the digital image data stored in the hard disk 70B, thereby changing an output range of digital image data to be output to the noteworthy scene synthesized image data area of the hard disk 70B. Therefore, digital image data representing desired scenes can be obtained with certainty.

In other words, in the image information collecting system 10B according to this embodiment, the subject (player H) carries the marker 20 for transmitting the radio signal representing the location, the digital image data acquired via the cameras 40 for shooting the subject from mutually different positions is stored in the hard disk 70B, and, on the basis of the location of the subject represented by the radio signal transmitted from the marker 20, digital image data including image data representing at least the subject is extracted from the digital image data stored in the hard disk 70B, thereby changing an output range of digital image data to be output to the noteworthy scene synthesized image data area of the hard disk 70B. Therefore, digital image data representing desired scenes can be obtained with certainty.

Further, in the image information collecting system 10B according to this embodiment, the information representing a sound intensity is collected, and digital image data including image data representing at least the subject is extracted from the digital image data acquired via the cameras 40 during time spans including the times at which the intensity of sound represented by the collected information has exceeded the predetermined level. Therefore, extraction of noteworthy scenes from the digital image data acquired by shooting can be easily performed.

Furthermore, in the image information collecting system 10B according to this embodiment, the cameras 40 are placed in mutually different positions around the area to be shot, and the all of the area to be shot can be shot by combining the shooting areas of the cameras 40. Therefore, the subject can be shot almost certainly by the cameras 40 wherever in the area to be shot the subject is located. As a result, digital image data representing desired scenes can be obtained with certainty.

Moreover, in the image information collecting system 10B according to this embodiment, the extracted digital image data is synthesized such that digital image data shot by the cameras 40 whose shooting areas are adjacent to each other become successive in order of time. Therefore, a motion image, which appears substantially the same as when the subject located in the area to be shot is continuously observed (shot) while changing the observing (shooting) point, can be reproduced.

It should be noted that, although a case in which the location of the subject is specified using the GPS is described in the embodiments above, this is not intended to limit the invention. The location of the subject may be specified by any means, for example, by using the PHS, or by making the marker transmit an electric wave and specifying the source of the electric wave.

Figure 14:
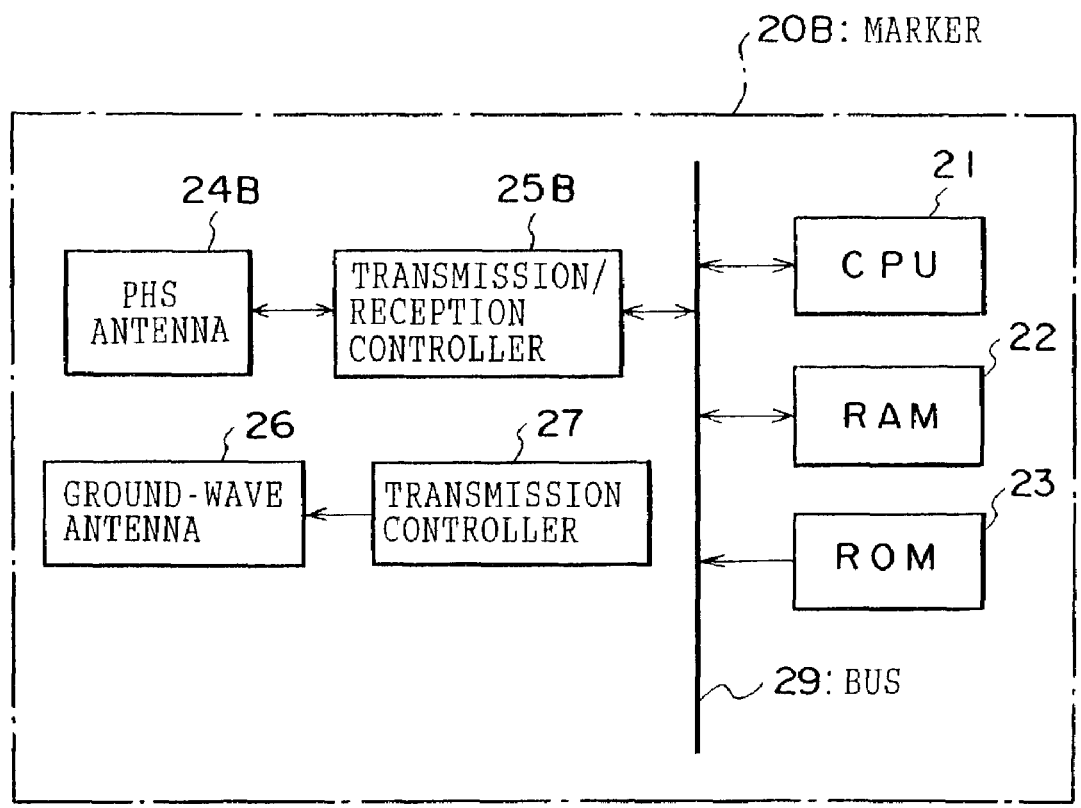
FIG. 14 is a block diagram showing a configuration of a marker utilizing a PHS.

FIG. 14 shows an exemplary configuration of a marker 20B used when the location of the subject is specified using the PHS. As shown in FIG. 14, the marker 20B comprises a PHS antenna 24B and a transmission/reception controller 25B for communicating with PHS base stations, instead of the GPS antenna 24 and the reception controller 25 shown in FIG. 2.

In this case, the CPU 21 uses the PHS antenna 24B and the transmission/reception controller 25B to communicate with available PHS base stations to receive positional information from each of the base stations, which positional information is always transmitted from PHS base stations. Based on the positional information received from the base stations, the CPU 21 derives a location of the marker 20 and transmits data representing the location as a radio signal via the transmission controller 27 through the ground-wave antenna 26. The control device 30 according to the above-described first embodiment sets the shooting direction and optical magnification, and the like, of the cameras 40 so that the cameras 40 shoot the subject at the location of the marker 20B represented by the received radio signal. Further, in the control device 30 according to the above-described second embodiment, the location of the marker 20B represented by the received radio signal is recorded through the subject location recording process (see FIG. 19).

It should be noted that, in this case, the positional information received by the marker 20B from the base stations may be transmitted as a radio signal to the control device 30 by the transmission controller 27 via the ground-wave antenna 26, and the control device 30 may specify the location of the marker 20B on the basis of the positional information received from the base stations.

In the above-described system 10 using the PHS, computation for specifying the location performed by the marker 20B can be simplified when compared with the image information collecting system 10 using the GPS, although accuracy of specification of the subject location is lowered.

Figure 15A:
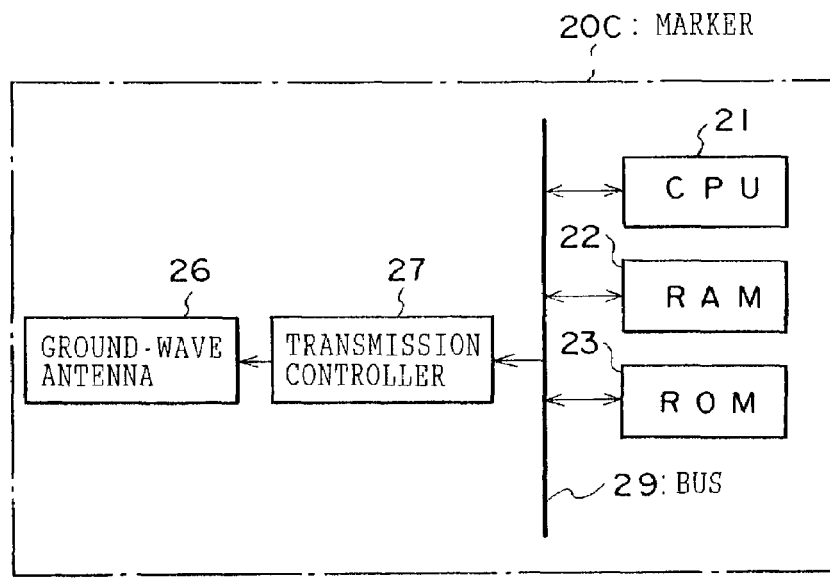
FIG. 15A is a block diagram showing a configuration of a marker used in a case in which the marker transmits an electric wave and the source of the electric wave is specified.
Figure 15B:
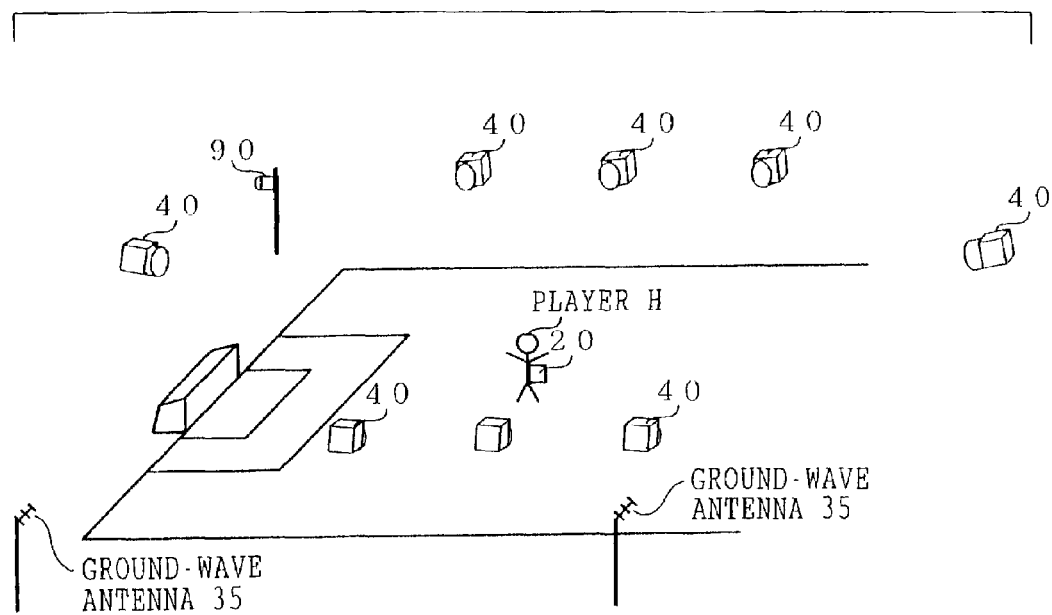
FIG. 15B is a perspective view showing an example of placement of components of the image information collecting system in this case.

FIG. 15A shows an exemplary configuration of a marker 20C used when the marker transmits a radio wave and a source of the radio wave is specified. FIG. 15B shows an exemplary placement of the components of the image information collecting system 10 in this case.

As shown in FIG. 15A, the marker 20C does not include the GPS antenna 24 and the reception controller 25, which are necessary for the marker 20 shown in FIG. 2, and therefore the marker 20C can be made smaller and lighter than the marker 20.

The marker 20C transmits a radio wave of a predetermined frequency via the ground-wave antenna 26 and the transmission controller 27. Further, as shown in FIG. 15B, the ground-wave antennas 35, which are connected to the reception controller 36 of the control device 30, are placed at mutually different positions around a space to be shot.

In this case, a horizontal position (latitude and longitude) of the subject is specified by triangulation on the basis of directions of the source (i.e., the marker 20C) of the radio wave, which is received by the ground-wave antennas 35, from the ground-wave antennas 26, and distances between the antennas 35. Since the marker 20C does not need a function for transmitting and receiving GPS signals or PHS signals, it can be produced at a low cost and made compact.

Although the system 10 utilizing the GPS according to the above-described embodiments has been described with respect to a case where latitudinal and longitudinal information is derived, this is not intended to limit the invention. For example, in addition to latitude and longitude, altitude may be included in the information to be derived. In this case, GPS signals must be received from at least four GPS satellites. Since a height of the subject can also be found in this case, the invention can also be applied to sports in which the subject also moves in a vertical dimension, such as basketball, the pole vault, the running high jump, and the like.

Further, although the above-described embodiments have been described with respect to a case in which there is only one subject, this is not intended to limit the invention, and there may be two or more subjects.

When there are two or more subjects (and therefore two or more markers), the CPU 21 of the marker 20 derives the positional information based on GPS signals received via the GPS antenna 24 and the reception controller 25, and controls the transmission controller 27 so as to transmit, as a radio signal, a combination of the derived positional information and identification information for specifying the marker 20. The control device 30 specifies the player carrying the marker 20 transmitting the radio signal on the basis of the identification information included in the received radio signal, and performs the tracking process, the image accumulating process, the noteworthy scene extracting process, and the like, in the same manner as previously described.

The identification information may be an identification number uniquely allocated to each marker 20. However, this is not intended to limit the invention, and any type of information which differs between the markers 20 can be applied.

Furthermore, in the above-described embodiments, the location of the marker 20 has been specified by the marker 20 itself on the basis of the received GPS signals. However, this is not intended to limit the invention. For example, the marker 20 may transmit the received GPS signals to the control device 30, and the control device 30 may specify the location of the marker 20. This reduces computational load at the marker 20, and allows an inexpensive CPU to be used for the CPU 31 of the marker 20.

Moreover, in the above-described embodiments, the digital image data acquired via the cameras 40 is accumulated on the hard disk 70A (70B) through the control device 30. However, this is not intended to limit the invention. For example, the digital image data may be accumulated on the hard disk 70A (70B) directly from the cameras 40. This reduces processing load at the control device 30, thereby improving performance of the cameras 40 in tracking the subject.

In addition, in the above-described embodiments, the subject is an athlete. However, this is not intended to limit the invention. For example, the subject may be a ball used in an athletic event. Since shooting is performed by tracking the ball, to which most of the audience pays attention in the image information collecting system 10 of the above-described first embodiment, or digital image data is extracted by tracking the ball in the image information collecting system 10 of the above-described second embodiment, images satisfying a general audience can be collected.

Further, in the above-described embodiments, digital video cameras for shooting motion images have been used as the shooting devices in the invention. However, this is not intended to limit the invention. For example, digital still cameras may be used in the invention. In this case, still images are shot by the still cameras at a predetermined time interval, and are sequentially stored on the hard disk 70A (70B). The effects of the above-described embodiments can be similarly obtained in this case (modification).

It should be noted that the flows of the processing programs described in the above-described embodiments (see FIGS. 8–10, 12, 19 and 20) are examples, and can be modified without departing from the scope and spirit of the invention.

As described above, in the system for collecting image information according to the first aspect of the invention and the method for collecting image information according to the second aspect of the invention, the subject is provided with the transmission device for transmitting the radio signal representing the subject's location, the shooting directions of the shooting devices which shoot the subject from mutually different directions are controlled to shoot the subject on the basis of the location of the subject represented by the radio signal transmitted from the transmission device, and the image information acquired via the shooting devices are stored in the storage device. Therefore, image information representing desired scenes can be obtained with certainty.

Further, in the system for collecting image information according to the third aspect of the invention and the method for collecting image information according to the fourth aspect of the invention, the subject is provided with the transmission device for transmitting the radio signal representing the subject's location, image information acquired via the shooting devices for shooting the subject from mutually different positions is stored in the storage device, and image information including image information representing at least the subject is extracted from the image information stored in the storage device on the basis of the location of the subject represented by the radio signal transmitted from the transmission device. Therefore, image information representing desired scenes can be obtained with certainty.

Furthermore, in the system for collecting image information according to the fifth aspect of the invention and the method for collecting image information according to the sixth aspect of the invention, the location signal representing the location of the subject is obtained, image information acquired via the shooting devices for shooting the subject from mutually different directions or positions is stored in the storage device, and the output range of the image information is changed on the basis of the location information so that image information representing at least the subject is included. Therefore, image information representing desired scenes can be obtained with certainty.

What is claimed is:

1. A system for collecting image information comprising:
   a transmission device provided at a subject for transmitting a radio signal representing a location of the subject;
   shooting devices for shooting the subject from mutually different directions to generate image information of the subject;
   a storage device for storing the generated image information;
   changing devices for changing shooting directions of the shooting devices;
   a control device for receiving the radio signal transmitted from the transmission device and controlling the changing devices on the basis of location information of the subject represented by the signal so that at least one of the shooting devices is directed to shoot the subject;
   collecting means for collecting sound information of sound generated at at least one of the subject and surroundings thereof while the subject is shot by the shooting devices; and
   extracting means, connected to the collecting means and the storage device, for extracting, from the image information stored in the storage device, image information acquired during particular time spans including times, at which an intensity of sound represented by the sound information has exceeded a predetermined level.

2. The system for collecting image information of claim 1, wherein the control device calculates distances from the shooting devices to the subject on the basis of the location information of the subject and controls each of the shooting devices so that an optical magnification for shooting increases as distance increases.

3. The system for collecting image information of claim 1, wherein the subject is at least one of an athlete and a ball used in an athletic event.

4. A method for collecting image information of a subject using shooting devices for shooting the subject from mutually different directions and a storage device for storing the image information of the subject, comprising the steps of:
   providing the subject with a transmission device for transmitting a radio signal representing a location of the subject;
   receiving the radio signal and controlling a shooting direction of at least one of the shooting devices on the basis of location information of the subject represented by the radio signal so that at least one of the shooting devices shoots the subject;
   storing the image information acquired via the shooting devices in the storage device;
   collecting sound information of sound generated at at least one of the subject and surroundings thereof while the subject is shot by the shooting devices; and
   extracting, from the image information stored in the storage device, image information acquired during particular time spans including times, at which an intensity of sound represented by the sound information has exceeded a predetermined level.

5. The method for collecting image information of claim 4, further comprising the steps of:
   calculating distances from the shooting devices to the subject on the basis of the location information of the subject; and
   controlling each of the shooting devices so that optical magnification for shooting increases as distance increases.

6. The method for collecting image information of claim 4, wherein the subject is at least one of an athlete and a ball used in an athletic event.

7. A system for collecting image information comprising:
   a transmission device provided at a subject for transmitting a radio signal representing a location of the subject;
   shooting devices for shooting the subject to generate image information including images of the subject, the shooting devices being positioned so that at least one of the shooting devices can shoot the subject;
   a storage device for storing the image information acquired via the shooting devices; and
   an extracting device for extracting, from the image information stored in the storage device, image information including images representing at least the subject on the basis of the location information of the subject represented by the radio signal transmitted from the transmission device.

8. The system for collecting image information of claim 7, wherein the shooting devices are placed in mutually different positions around an area to be shot and substantially all of the area to be shot can be shot by combining shooting areas of the shooting devices.

9. The system for collecting image information of claim 8, further comprising image synthesizing means for synthesizing the image information extracted by the extracting device such that image information shot by the shooting devices whose shooting areas are adjacent to each other become successive in order of time.

10. The system for collecting image information of claim 7, further comprising:
   collecting means for collecting sound information of sound generated at at least one of the subject and surroundings thereof while the subject is shot by the shooting devices; and
   extracting means, connected to the collecting means and the storage device, for extracting, from the image information stored in the storage device, image information acquired during particular time spans including times, at which an intensity of sound represented by the sound information has exceeded a predetermined level.

11. The system for collecting image information of claim 10, wherein the storage device stores, together with the image information, time information representing a shooting time at which an image has been shot.

12. The system for collecting image information of claim 11, wherein the storage device stores time information corresponding to the times at which the intensity of sound represented by the sound information has exceeded the predetermined level.

13. The system for collecting image information of claim 12, wherein, on the basis of time information corresponding to the times at which the intensity of sound has exceeded the predetermined level, the extracting means extracts, from the storage device, the image information acquired during the particular time spans including the times.

14. A method for collecting image information of a subject using shooting devices and a storage device for storing the image information, comprising the steps of:
   providing the subject with a transmission device for transmitting a radio signal representing a location of the subject;
   shooting the subject using the shooting devices in such a manner that at least one of the shooting devices can shoot the subject to generate image information including images of the subject;
   storing the image information in the storage device; and
   extracting, from the image information stored in the storage device, image information including images representing at least the subject on the basis of the received location information of the subject.

15. The method for collecting image information of claim 14, wherein the shooting devices are placed in mutually different positions around an area to be shot and substantially all of the area to be shot can be shot by combining shooting areas of the shooting devices.

16. The method for collecting image information of claim 15, further comprising the step of synthesizing the extracted image information such that image information shot by the shooting devices whose shooting areas are adjacent to each other become successive in order of time.

17. The method for collecting image information of claim 14, wherein sound information of sound generated at at least one of the subject and surroundings thereof is collected while the subject is shot by the shooting devices, and image information acquired during particular time spans including times, at which an intensity of sound represented by the sound information has exceeded a predetermined level, is extracted from the image information stored in the storage device.

18. The method for collecting image information of claim 17, wherein the storage device stores, together with the image information, time information representing a shooting time at which an image has been shot.

19. The method for collecting image information of claim 18, wherein the storage device stores time information corresponding to the times at which the intensity of sound represented by the sound information has exceeded the predetermined level.

20. The method for collecting image information of claim 19, wherein, on the basis of time information corresponding to the times at which the intensity of sound has exceeded the predetermined level, the image information acquired during the particular time spans including the times is extracted from the storage device.

21. A system for collecting image information comprising:
   obtaining means for obtaining location information representing a location of a subject;
   shooting devices for shooting the subject to generate image information, the shooting devices being placed in mutually different positions so that at least one of the shooting devices can shoot the subject;
   a storage device for storing the image information acquired via the shooting devices;
   extracting means for extracting, from the image information stored in the storage device, image information representing images of the subject; and
   output changing means for changing, on the basis of the obtained location information, a range of the image information from at least one of the extracting means and the shooting devices, so that the extracted image information includes the image information of the subject.

22. A method for collecting image information of a subject using shooting devices placed in mutually different positions and a storage device for storing the image information, comprising the steps of:
   obtaining location information representing a location of the subject;
   shooting the subject using the shooting devices in such a manner that at least one of the shooting devices can shoot the subject to generate image information including images of the subject;
   storing the image information in the storage device;
   extracting, from the image information stored in the storage device, image information representing images of the subject; and
   changing, on the basis of the obtained location information, a range of the image information obtained by at least one of shooting and extracting, so that the extracted image information includes the image information of the subject.

* * * * *